(12) United States Patent
Wilson et al.

(10) Patent No.: US 7,979,236 B2
(45) Date of Patent: Jul. 12, 2011

(54) FINDING MINIMUM REMAINING FLOAT FOR A PATTERN OF NON-UNIFORM SIZED FEATURES

(75) Inventors: Bruce A. Wilson, O'Fallon, MO (US); Paul C. Hollingshead, Florissant, MO (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 12/206,381

(22) Filed: Sep. 8, 2008

(65) Prior Publication Data
US 2010/0063770 A1   Mar. 11, 2010

(51) Int. Cl.
*G01B 7/14* (2006.01)
(52) U.S. Cl. ...................................................... 702/155
(58) Field of Classification Search .................. 702/155, 702/157, 158, 150, 156
See application file for complete search history.

(56) References Cited

U.S. PATENT DOCUMENTS

| | | | |
|---|---|---|---|
| 4,754,417 A | 6/1988 | Beeson et al. | |
| 4,918,627 A | 4/1990 | Garcia et al. | |
| 6,148,494 A * | 11/2000 | Bauer et al. | 29/407.05 |
| 6,978,220 B2 | 12/2005 | Wilson | |
| 6,993,431 B2 | 1/2006 | Hollingshead et al. | |
| 7,212,883 B2 | 5/2007 | Hollingshead et al. | |
| 7,248,992 B2 | 7/2007 | Wilson | |
| 2005/0203661 A1 * | 9/2005 | Hollingshead et al. | 700/175 |
| 2005/0288889 A1 * | 12/2005 | Wilson et al. | 702/155 |
| 2005/0288890 A1 * | 12/2005 | Hollingshead et al. | 702/155 |
| 2006/0052977 A1 * | 3/2006 | Wilson | 702/155 |

OTHER PUBLICATIONS

PCT International Search Report for PCT/US2009/056218 dated Jan. 27, 2010.

* cited by examiner

*Primary Examiner* — Mohamed Charioui
(74) *Attorney, Agent, or Firm* — Yee & Associates, P.C.

(57) ABSTRACT

A method for analyzing tolerances for features for an object. A framework may be created from the plurality of features for the object. The framework may be fitted to a plurality of manufactured features for the object based on the plurality of features to form a fit framework. A remaining clearance may be identified between each of a plurality of manufactured sizes associated with the plurality of features and each of plurality of virtual conditions for the plurality of features to form a plurality of remaining clearances. A plurality of remaining clearance geometric shapes may be formed from the plurality of remaining clearances. The plurality of remaining clearance features may be positioned around a single true position. A common region may be identified from between the plurality of remaining clearances. A minimum remaining float may be identified from the common region. A resulting pattern transformation may be determined.

24 Claims, 14 Drawing Sheets

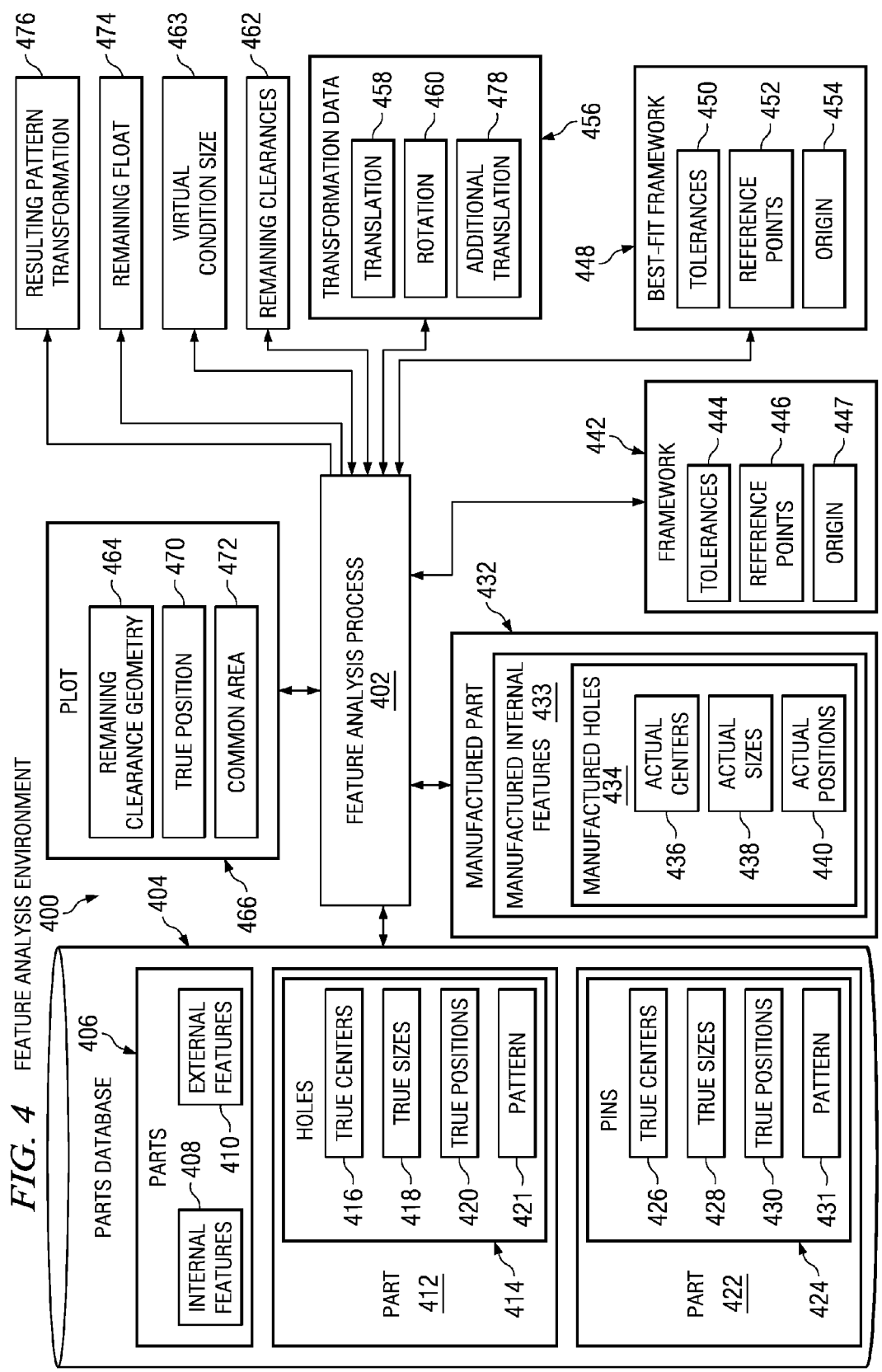

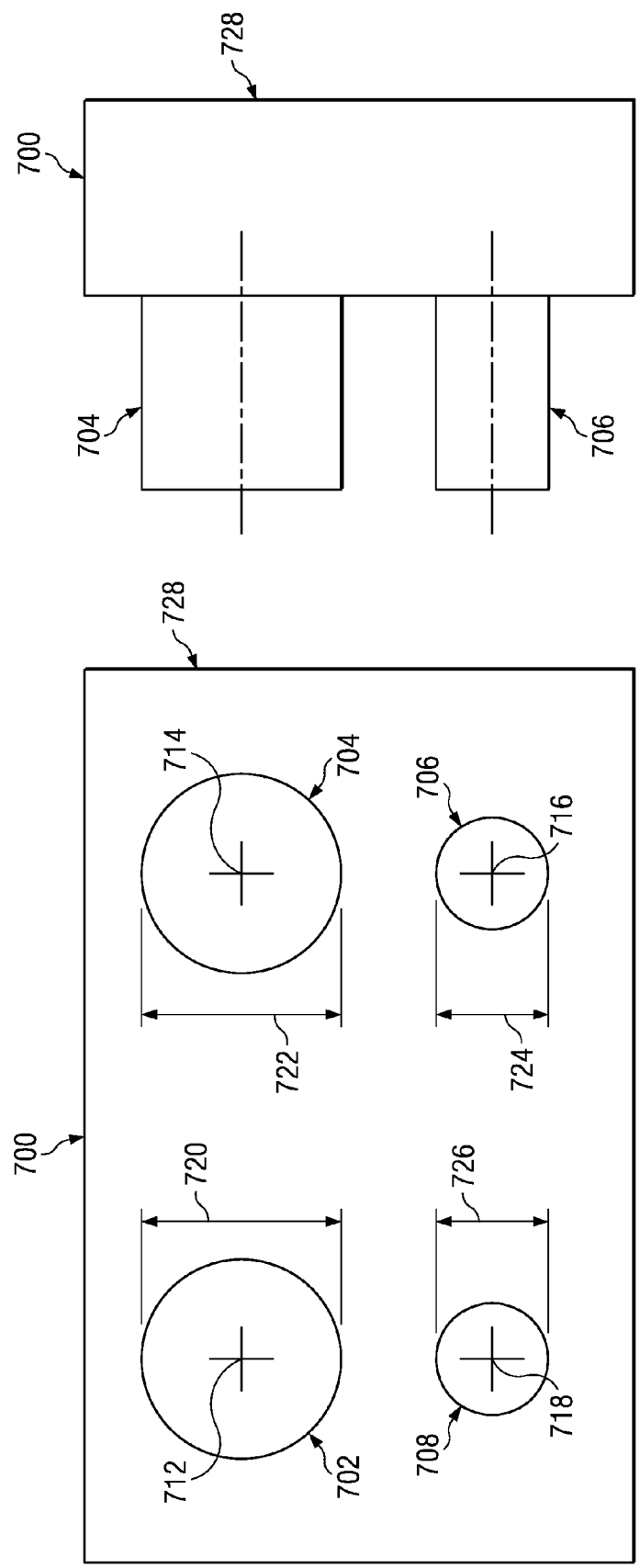

… (1)

FINDING MINIMUM REMAINING FLOAT FOR A PATTERN OF NON-UNIFORM SIZED FEATURES

BACKGROUND INFORMATION

1. Field

The present disclosure relates generally to manufacturing and in particular to a method and apparatus for manufacturing objects. Still more particularly, the present disclosure relates to a method, apparatus, and computer-usable program code for evaluating the assembly of parts with patterns of features that may have different sizes.

2. Background

American, Canadian, German, and International Organization for Standardization (ISO) standards may define methods for specifying multiple levels of feature related tolerances. However, the manufacturing industry may not have an efficient or effective way of determining whether the requirements are achieved. Furthermore, no means for accurately assessing the effects of computer simulations with respect to feature related tolerances may be present for features of more than one design size.

In manufacturing products such as aircraft, numerous parts may be assembled and attached to each other to form an aircraft. For example, without limitation, the airframe of an aircraft may involve matching up hole patterns between various mating parts. In designing these parts and hole patterns, it may be desirable to ensure that when assembled, fasteners can be placed through the holes, or pins in one part, may match up with holes in another part. Some variance may be present in the location and/or size of holes. The tolerance between the size of holes and/or the location of holes may be analyzed to determine whether parts can be properly assembled.

Inspection data of manufactured articles and varied feature data in simulations are not currently evaluated in an automated and correct manner to determine whether or not combined feature parameters, such as hole size and location, are acceptable to the applied feature-relating tolerances when the features are of multiple design sizes. Evaluation of manufactured or simulated hole size, form, orientation, and location may all be completed separately, and confidence in each evaluation may be low.

One method for inspecting data may include paper gauging, in which information may be recorded on paper. This type of process, however, may be time consuming and may have problems of best fitting circles into different hole positions for parts.

Another method may use variation analysis software to assess feature-related tolerances. Approximations and iterations may be used that combine size, orientation, and location variations. Multiple iterations of inspecting feature size and positions may be used to increase accuracy. Multiple iterations, with this type of approximation, may increase the amount of analysis time.

Accordingly, there is a need for a method and apparatus for minimizing errors and time needed to evaluate hole and size locations with respect to tolerances for different features which overcome the problems described above, as well as other problems.

SUMMARY

An embodiment of the present disclosure provides a method for analyzing tolerances for a plurality of features for an object. A framework may be created from the plurality of features for the object. The framework may be fitted to a plurality of manufactured internal features for the object based on the plurality of features to form a fit framework. A remaining clearance may be identified between each of a plurality of manufactured sizes associated with the plurality of features and each of plurality of true sizes for the plurality of features to form a plurality of remaining clearances. A plurality of remaining clearance geometric shapes may be formed from the plurality of remaining clearances. The plurality of remaining clearance features may be positioned around a single true position. A common region may be identified from between the plurality of remaining clearance features positioned around the single true position. A minimum remaining float may be identified from the common region.

In another advantageous embodiment, a method may be present for analyzing tolerances for a plurality of holes, for an object. Positional tolerances of each of a plurality of manufactured holes may be determined. Size tolerances of each of the plurality of manufactured holes also may be determined. An origin may be selected for each of the plurality of manufactured holes to form a plurality of true positions. A framework may be formed from the plurality of true positions and the framework may be fitted to a plurality of manufactured holes for the object based on the plurality of holes to form a fit framework. A remaining clearance between each of a plurality of manufactured sizes associated with the plurality of holes and each of a plurality of true sizes for the plurality of holes may be identified to form a plurality of remaining clearances. A location may be determined for the each of the plurality of manufactured internal holes to form a plurality of locations. A size of each of the plurality of manufactured internal holes may be determined to form a plurality of manufactured sizes. The framework may be fitted to the plurality of locations of each of the plurality of manufactured internal holes to form the fit framework. A transformed relationship between the framework and the fit framework to form a best fit framework transformation may be determined. A relation may be determined for each of the plurality of manufactured internal holes to the fit framework to form a plurality of relations. The remaining clearance may be determined for each manufactured internal hole in the plurality of manufactured holes to form a plurality of remaining clearances. A plurality of remaining clearance geometric shapes may be formed from the plurality of remaining clearances. The plurality of remaining clearance geometrical shapes may be positioned around a single true position. A plurality of transformed true positions may be superimposed into the single true position to form the single association. The plurality of locations may be organized for the plurality of manufactured internal holes relative to the single association to form a plurality of organized manufactured internal holes in which the single association forms the single true position. A common region may be identified from between the plurality of remaining clearance geometrical shapes positioned around the single true position. A maximum inscribed circle within the common region may be determined and a diameter for the maximum inscribed circle also may be determined. A center location of the maximum inscribed circle and a transformation of the center location of the maximum inscribed circle from the single association may be determined. A minimum remaining float from the maximum inscribed circle may be determined. A pattern transformation by combining the best fit framework transformation and the distance may be determined.

In yet another advantageous embodiment, a computer program product for analyzing tolerances for a plurality of holes for an object may comprise a computer recordable storage medium and program code stored on the computer recordable storage medium. Program code may be present for determining positional tolerances of each of a plurality of manufactured holes. Program code also may be present for determining size tolerances of the each of the plurality of manufactured holes. Program code may be present for selecting an origin for each of the plurality of manufactured holes to form a plurality of true positions. Program code may be present for forming a framework from the plurality of true positions. There may also be program code present for fitting the framework to the plurality of manufactured holes for the object based on the plurality of holes to form a fit framework. There may be program code for determining a size of each of the plurality of manufactured holes to form a plurality of manufactured sizes. Program code may be present for identifying a remaining clearance between each of the plurality of manufactured sizes associated with the plurality of holes and each of a plurality of virtual conditions for the plurality of holes to form a plurality of clearances. There may be program code for determining a location for the each of the plurality of manufactured holes to form a plurality of locations. There may be program code present for fitting the framework to the plurality of locations of each of the plurality of manufactured holes to form the fit framework. In addition, there may be program code for determining a transformed relationship between the framework and the fit framework to form a best fit framework transformation. Program code may be present for determining a relation for the each of the plurality of manufactured holes to the fit framework to form a plurality of relations. Program code may be present for determining the remaining clearance for each manufactured hole in the plurality of manufactured holes to form a plurality of remaining clearances. Program code also may be present for forming a plurality of remaining clearance geometric shapes from the plurality of remaining clearances. There may be program code present for positioning the plurality of remaining clearance geometric shapes around a single true position. There also may be program code present for superimposing a plurality of transformed true positions onto the single true position to form a single association. Program code may be present for organizing the plurality of locations for the plurality of manufactured holes relative to the single association to form a plurality of organized manufactured holes in which the single association forms the single true position. Program code may be present for identifying a common region from between the plurality of clearance geometric shapes positioned around the single true position. Program code also may be present for determining a maximum inscribed circle within the common region. Program code may also be present for determining a diameter for the maximum inscribed circle; determining a center location of the maximum inscribed circle; determining a transformation of the center location of the maximum inscribed circle from the single association to form a distance; and determining a minimum remaining float from the maximum inscribed circle. Program code may be present for determining a pattern transformation by combining the best fit framework transformation and the distance.

In still yet another advantageous embodiment, a data processing system may comprise a bus, a communications unit connected to the bus, a storage device connected to the bus, wherein the storage device includes program code, and a processor unit connected to the bus. The processor unit may execute the program code to create a framework from a plurality of features for an object. The processor unit also may execute the program code to fit the framework to a plurality of manufactured internal features for the object based on the plurality of features to form a fit framework. The processor unit may execute the program code to identify a remaining clearance between each of a plurality of manufactured sizes associated with the plurality of features and each of a plurality of true sizes for the plurality of features to form a plurality of remaining clearances. The processor unit also may execute the program code to form a plurality of remaining clearance features from the plurality of remaining clearances. In addition, the processor unit may execute the program code to position the plurality of remaining clearance features around a single true position; identify a common region from between the plurality of remaining clearance features positioned around the single true position; and identify a minimum remaining float from the common region.

In another advantageous embodiment, a computer program product for analyzing tolerance for a plurality of features for an object may comprise a computer recordable storage medium and program code stored on the computer recordable storage medium. Program code may be present for creating a framework from the plurality of features for the object. Program code also may be present for fitting the framework to a plurality of manufactured internal features for the object based on the plurality of features to form a fit framework. Program code may be present for identifying a remaining clearance between each of a plurality of manufactured sizes associated with the plurality of features and each of a plurality of true sizes for the plurality of features to form a plurality of remaining clearances. There may be program code present for forming a plurality of remaining clearance features from the plurality of remaining clearances. There also may be program code present for positioning the plurality of remaining clearance features around a single true position. Program code may be present for identifying a common region from between the plurality of remaining clearance features positioned around the single true position. Program code also may be present for identifying a minimum remaining float from the common region.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 4 is a diagram of a feature analysis environment in accordance with an advantageous embodiment;

FIG. 7 is a diagram illustrating a part with external features in accordance with an advantageous embodiment;

FIG. 8 is a side view of a part in accordance with an advantageous embodiment;

DETAILED DESCRIPTION

Figure 1:
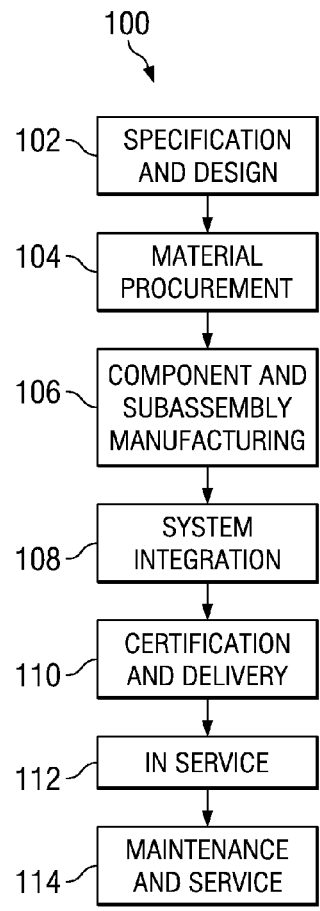
FIG. 1 is a flow diagram of an aircraft production and service methodology in accordance with an advantageous embodiment.
Figure 2:
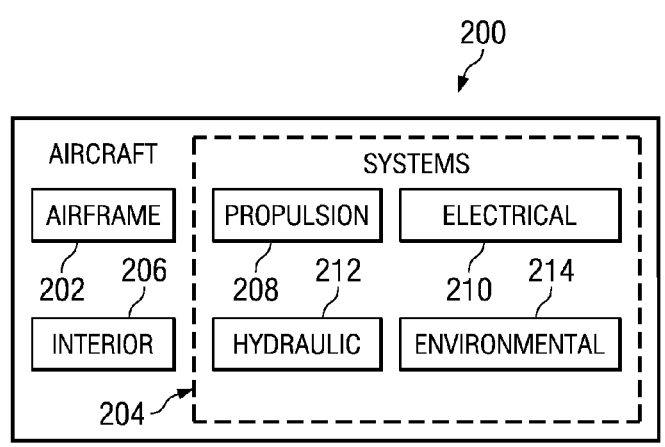
FIG. 2 is a block diagram of an aircraft in accordance with an advantageous embodiment.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
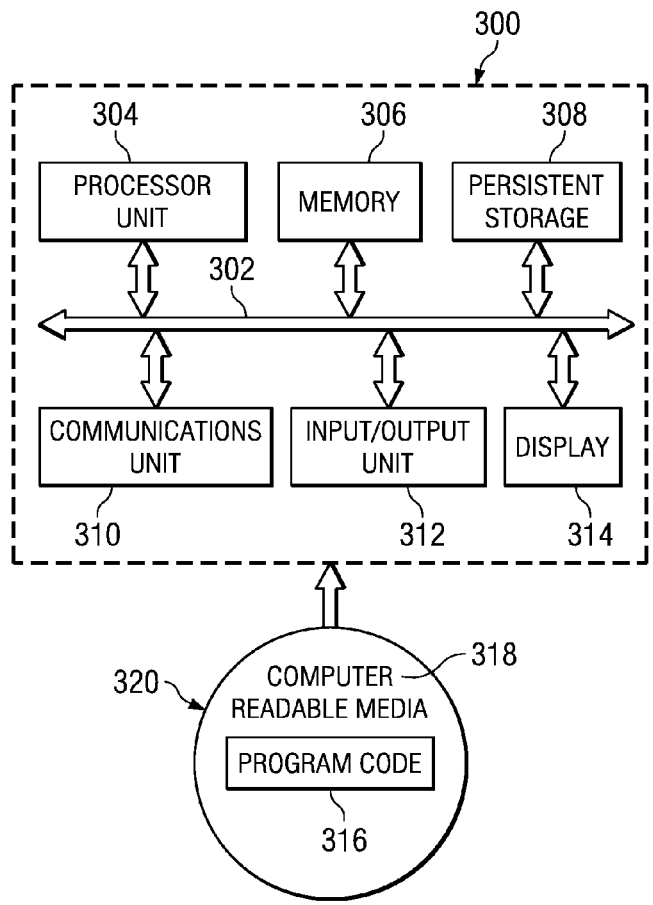
FIG. 3 is a diagram of a data processing system in accordance with an illustrative embodiment.

Turning now to FIG. 3, a diagram of a data processing system is depicted in accordance with an illustrative embodiment. In this illustrative example, data processing system 300 includes bus 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation.

For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308.

In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement bus 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in bus 302.

The different advantageous embodiments recognize and take into account that currently used processes for analyzing the mating of parts may be limited to features of a single design size. The different advantageous embodiments also recognize and take into account that currently used processes may use the actual feature surface and/or a best-fit geometry to determine a combined effect of size and location. The different advantageous embodiments recognize and take into account that in practice, different design features such as holes/pins within a pattern may have different design sizes and/or locations.

The different advantageous embodiments recognize and take into account that currently used processes may assume that all holes and/or pins have the same diameters. The different advantageous embodiments also recognize and take into account that in production, holes and/or pins may be non-uniform in size. The different advantageous embodiments take into account and accommodate for parts that may have different sizes within a pattern of features.

Thus, the different advantageous embodiments provide a method and apparatus for analyzing hole patterns. These hole patterns may have holes of the same or different diameters. The different advantageous embodiments take into account a clearance remaining in each feature in performing the analysis. In the different advantageous embodiments, an analysis of feature size and location variation may be performed to determine whether a pattern of two or more features on one part may be connected to another pattern of complementary features on another part.

Furthermore, the different advantageous embodiments provide a method and apparatus for analyzing hole patterns. The different advantageous embodiments take into account a clearance remaining in each feature in performing the analysis. In the different advantageous embodiments, an analysis of feature size and location variation may be performed to determine whether a pattern of two or more features of one or more design size meet the feature-relating tolerance requirements specified in the design documentation for the part.

With reference now to FIG. 4, a diagram of a feature analysis environment is depicted in accordance with an advantageous embodiment. Feature analysis environment 400 may be implemented using one or more data processing systems such as, for example, without limitation, data processing system 300 in FIG. 3.

In this example, feature analysis environment 400 may include feature analysis process 402 and parts database 404. Feature analysis process 402 and parts database 404 are examples of software components that may be implemented within data processing system 300 in FIG. 3. Parts database 404 may contain parts 406. Parts 406 may include internal features 408 and/or external features 410.

An internal feature may be, for example, without limitation, a hole, a slotted hole, a rectangular slot, a keyseat, and some other suitable internal feature. An external feature may be, for example, without limitation, a pin, a rail, a tab, or some other suitable external feature. Part 412 contains internal features 408 in the form of holes 414. Holes 414 have true centers 416, true sizes 418, true positions 420, and pattern 421 in these examples.

True centers 416 may be the centers designed and/or specified for holes 414. True centers 416 may be the centers for holes 414. True sizes 418 may be the designed or specified sizes for holes 414. True sizes 418 may be measured in a number of different ways. For example, without limitation, true sizes 418 may be measured as diameters, radiuses, and/or some other suitable measurement. True positions 420 are the designed or selected positions of holes 414 on part 412.

True positions 420 may be identified based on the location of true centers 416. Pattern 421 is a pattern of features for holes 414. Pattern 421 may identify an arrangement and/or location of holes 414 on part 412. As another example, part 422 may have external features 410 in the form of pins 424. Pins 424 may have true centers 426, true sizes 428, true positions 430, and pattern 431 in these examples.

Part 412 and part 422 may be parts designed to engage or connect to each other. For example, without limitation, pins 424 may fit into holes 414 to connect the parts to each other.

Manufactured part 432 may be a physical part and/or a simulated part in these examples. Simulating parts may be useful in determining tolerances, making design changes, and/or generating new designs. Manufactured part 432 may be generated from part 412 in these examples. Manufactured part 432 may include manufactured internal feature 433, such as, for example, without limitation, manufactured holes 434. Manufactured holes 434 may have actual centers 436, actual sizes 438, and actual positions 440. Actual centers 436 may be the centers for manufactured holes 434.

Actual sizes 438 may be different from true sizes 418. For example, without limitation, an actual size may be larger or smaller than a true size. Actual positions 440 may be the actual positions for manufactured holes 434. Actual positions 440 may include both a position on manufactured part 432, as well as an orientation.

Framework 442 may be created from part 412. Framework 442 may have tolerances 444, reference points 446, and origin 447. Framework 442 may provide relational information that accounts for the tolerances of each feature and the relationship between the tolerances of each feature in relation to a whole pattern of features for an object.

Tolerances 444 may identify tolerances for each hole within part 412. Tolerances 444 may provide tolerances that, if exceeded, would prevent part 412 from mating with a complimentary part such as, for example, without limitation, part 422.

Reference points 446 may be different points or locations on part 412. For example, reference points 446 may be derived from true positions 420. Further, reference points 446 may include, for example, without limitation, an edge of a hole, an edge of a part, or some other suitable location on part 412. Origin 447 may provide a point or location on part 412 from which reference points 446 may be positioned.

Framework 442 may be placed onto manufactured part 432. In these examples, framework 442 may be placed onto manufactured part 432 based on true positions 420 for part 412 from which manufactured part 432 has been generated. Framework 442 may be transformed to form best-fit framework 448 relative to actual positions 440. Best-fit framework 448 may have tolerances 450, reference points 452, and origin 454. Reference points 452 may have a different position (than reference points 446) due to the transformation from the position of framework 442. Best-fit framework 448 may be generated by identifying a best-fit to manufactured holes 434.

The transformation of framework 442 to form best-fit framework 448 may be performed to obtain a best-fit without changing the structure of best-fit framework 448 from framework 442. A best-fit may be obtained using various best-fit methods such as, for example, without limitation, a least squares method, a total least squares method, or some other suitable method.

The transformation to form best-fit framework 448 may involve translating and/or rotating framework 442 from its original position on manufactured part 432. In these examples, the translation and/or rotation may be evaluated relative to origin 447. Transformation data 456 may include translation 458 and/or rotation 460 around an axis normal to where a plane on which best-fit framework 442 sits.

Feature analysis process 402 may identify remaining clearances 462 for each manufactured feature. Remaining clearances 462 may be a difference between manufactured features such as, for example, without limitation, manufactured holes 434 and virtual condition size 463. Virtual condition size 463 may be determined in accordance with the existing American Society of Mechanical Engineers national standards Y14.5.

The virtual condition for an internal feature may be the specified maximum material size minus any specified geometric tolerances. For an external feature, virtual condition size 463 may be the maximum material size plus any specified geometric tolerances. Geometric tolerances may include, for example, without limitation, form, orientation, and/or position tolerances. Maximum material size may be the dimension limit at which the most material exists in the feature. This limit may be the maximum allowed external feature size and/or the smallest allowed internal feature size. True sizes 418 and true sizes 428 may be equivalent to a maximum material size.

From remaining clearances 462, remaining clearance features in the form of remaining clearance geometry 464 may be generated. Remaining clearance geometry 464 may be a geometric shape. This geometric shape may be two dimensional and/or three dimensional. For example, without limitation, with manufactured holes 434, remaining clearance geometry 464 may take the form of a cylinder. With remaining clearance geometry 464, plot 466 may be generated.

Plot 466 may include remaining clearance geometry 464 plotted around true position 470. True position 470 may be a single true position representative of true positions 420. As a result, locations for remaining clearance geometry 464 may be located around true position 470. Based on the location of remaining clearance geometry 464, common area 472 may be identified. If common area 472 is absent, then tolerances for holes 414 may have been exceeded when manufactured part 432 was produced.

Based on common area 472, feature analysis process 402 may identify remaining float 474. Remaining float 474 may identify a large as possible area based on common area 472. The coordinate distance from the center of the remaining float 474 and true position 470 may be additional translation value 478. Remaining float 474 may provide the capability to determine if the functional requirements of the feature-relating tolerance for part 412 have been achieved. A positive value for remaining float 474 may indicate that the pattern of features meets the functional fit requirements.

Remaining float 474 has a value that may be used to simultaneously evaluate the quality resulting from the combined manufactured size, orientation and location of all features in pattern 421.

The combined translation 458, rotation 460, and additional translation 478 may establish a resulting pattern transformation 476. Resulting pattern transformation 476 indicates the amount of pattern movement. This data may be useful for determining assembly effects.

The illustration of feature analysis environment 400 in FIG. 4 is not meant to imply physical and/or architectural limitations in the manner in which other advantageous embodiments may be implemented. For example, in other advantageous embodiments, additional or fewer components than those illustrated in feature analysis environment 400 may be used.

For example, without limitation, feature analysis process 402 may be implemented using multiple functions and/or components rather than the single component illustrated in FIG. 4. In some advantageous embodiments, parts database 404 may be located on a separate data processing system from feature analysis process 402. Further, parts database 404 may be comprised of multiple databases and/or other types of storage containing part information.

Figure 5:
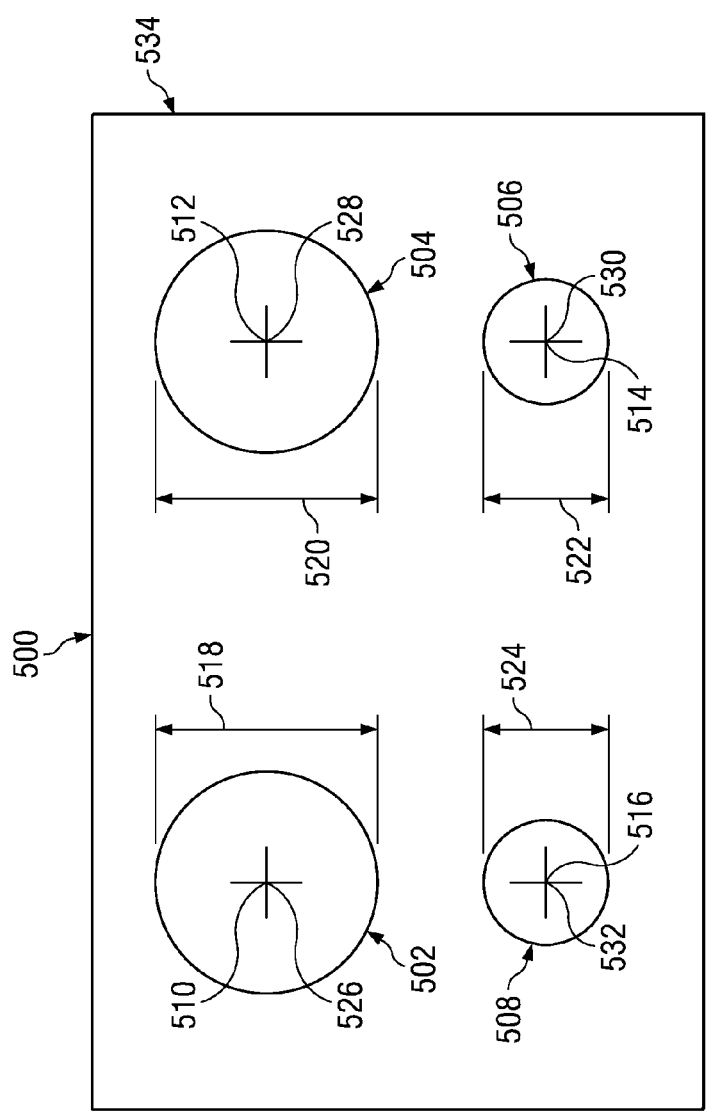
FIG. 5 is a diagram of a part that may be analyzed using a feature analysis environment in accordance with an advantageous embodiment.

With reference now to FIG. 5, a diagram of a part that may be analyzed using a feature analysis environment is depicted in accordance with an advantageous embodiment. In this example, part 500 is an example of one implementation for part 412 in FIG. 4. Part 500 may be, for example, without limitation, a rectangular plate.

Part 500 may have holes 502, 504, 506 and 508. In these examples, holes 502, 504, 506 and 508 are circular holes. In other advantageous embodiments, holes 502, 504, 506 and 508 may have different shapes. For example, without limitation, one or more of holes 502, 504, 506 and 508 may be polygonal and/or oval. Further, holes 502, 504, 506, and 508 may have different shapes with respect to each other. For example, without limitation, hole 502 may be circular, while hole 504 may be square.

Hole 502 has true center 510; hole 504 has true center 512; hole 506 has true center 514; and hole 508 has true center 516. A true center may be a center of a hole in these examples. Further, hole 502 has true size 518 and hole 504 may have true size 520. Hole 506 may have true size 522, and hole 508 may have true size 524. As can be seen in these examples, holes 502, 504, 506, and 508 may have different true sizes.

As illustrated, true size 518 and true size 520 may be the same, while true size 522 and true size 524 may be the same size. In these examples, the true sizes may be measured as diameters. Of course, with other advantageous embodiments, other types of measurements may be used to specify true sizes. For example, without limitation, radiuses, circumferences, or other suitable measurements may be used for true sizes.

Hole 502 may have true position 526 on part 500. Hole 504 may have true position 528. Hole 506 may have true position 530, and hole 508 may have true position 532. A true position may be a designed position on part 500. In these examples, the location of true centers 510, 512, 514 and 516 may be used to identify true positions 526, 528, 530 and 532 for holes 502, 504, 506 and 508, respectively.

Different points on a feature, such as a hole, may be used to track the position of a feature between a feature's true position and the feature's manufactured position. For example, without limitation, holes 502, 504, 506 and 508, and true centers 510, 512, 514, and 516, respectively, may be used to track the position of the holes.

When holes have other shapes, other features may be used. For example, without limitation, if a rectangular hole is used, points at the surface of the sides and corners of the rectangle may be used. Also, the center of the rectangle may also be used to track the position, in this type of feature.

The illustration of part 500 may be an illustration of an actual part and/or a computer generated drawing and/or simulation of part 500. Information such as, for example, without limitation, the true centers, true positions, and sizes of holes 502, 504, 506 and 508 may be represented as data for analysis.

Figure 6:
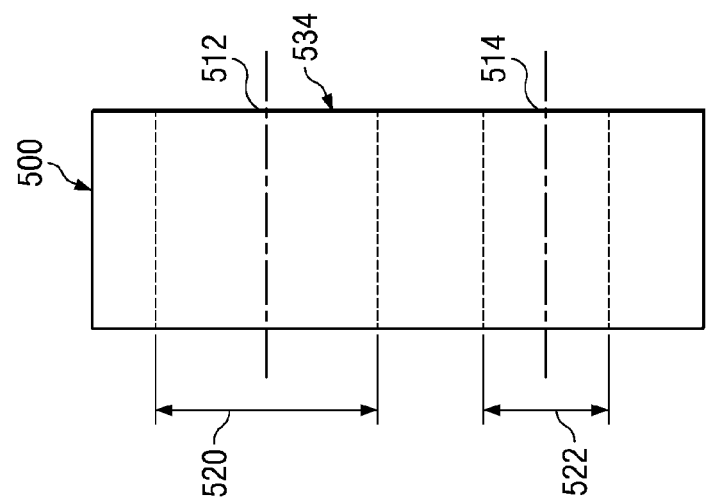
FIG. 6 is a side view of a part in accordance with an advantageous embodiment.

With reference now to FIG. 6, a side view of a part is depicted in accordance with an advantageous embodiment. In this example, part 500 is shown in a side view along side 534.

With reference now to FIG. 7, a diagram illustrating a part with external features is depicted in accordance with an advantageous embodiment. In this example, part 700 includes external features in the form of pins. Part 700 is an example of one implementation for part 422 in FIG. 4. Part 700 includes pins 702, 704, 706 and 708. These pins may have true centers 712, 714, 716 and 718. Pins 702, 704, 706 and 708 may have sizes 720, 722, 724 and 726, respectively. Pins 702, 704, 706 and 708 may be designed to fit into holes 502, 504, 506 and 508, respectively. In other words, part 700 may be connected and/or engaged to part 500.

With reference now to FIG. 8, a side view of a part is depicted in accordance with an advantageous embodiment. In this example, a side view of part 700 from side 728 is illustrated in these examples.

Figure 9:
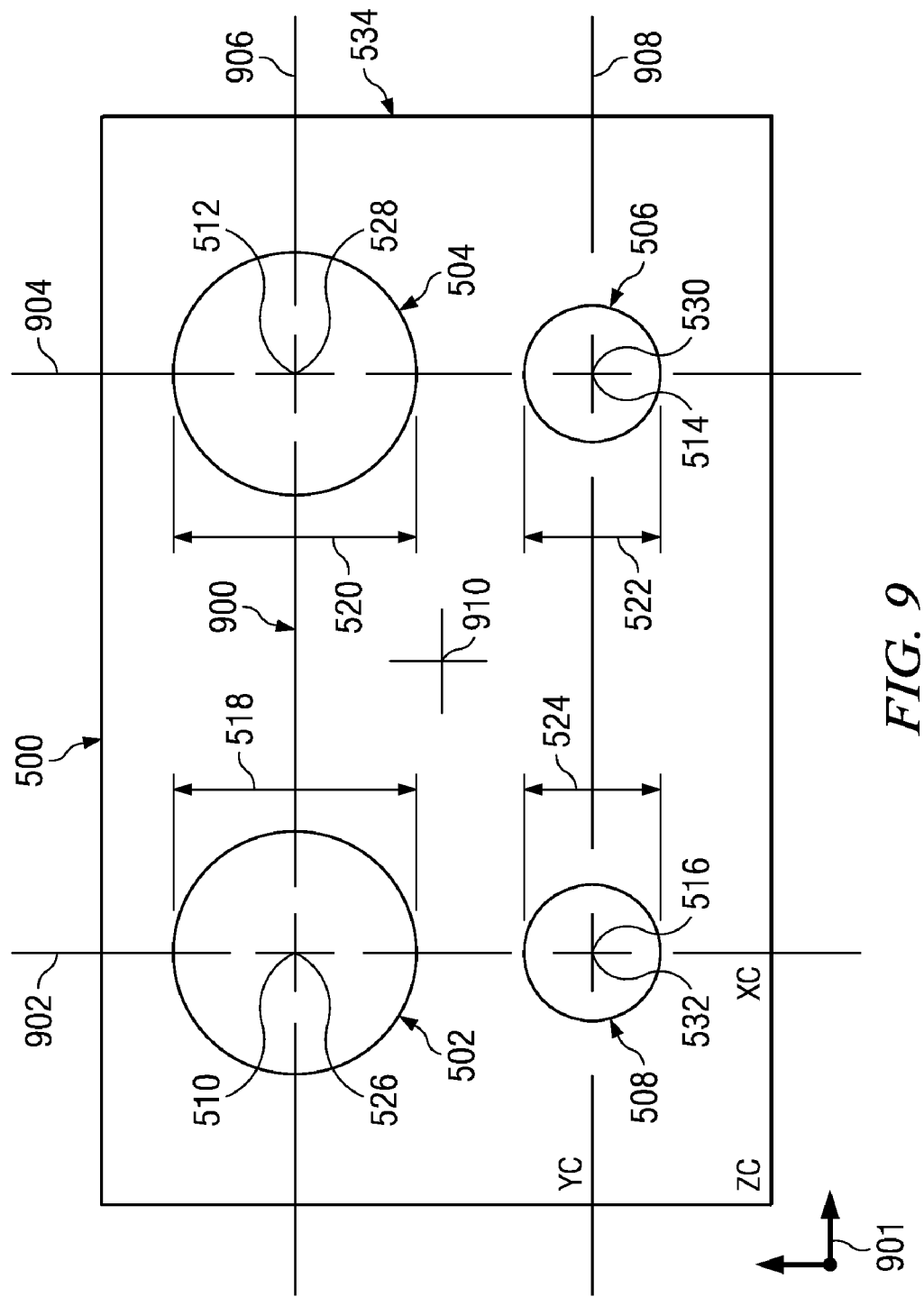
FIG. 9 is a diagram illustrating a feature-relating tolerance zone framework for a part in accordance with an advantageous embodiment.

With reference now to FIG. 9, a diagram illustrating a feature-relating tolerance zone framework for a part is depicted in accordance with an advantageous embodiment. In this example, framework 900 may be an example of a feature-relating tolerance framework for part 500, and may be an example of one implementation for framework 442 in FIG. 4. Framework 900 may be derived and/or created using part 500 in these examples.

In this illustrative example, framework 900 may provide tolerances that may be required for a four-pin part, such as part 700, to make and/or connect to part 500.

In this illustrative example, framework 900 may employ coordinate system 901. Coordinate system 901 may be, for example, without limitation, an xyz coordinate system. True center 516 may be used as an origin for coordinate system 901. True positions 526, 528, 530 and 532 for holes 502, 504, 506 and 508 may be used as reference points for framework 900.

In this illustrative example, framework 900 may include line 902, line 904, line 906, and line 908. The intersections of these lines may define true positions 526, 528, 530, and 532 for holes 502, 504, 506, and 508. Framework 900 also may include reference points in addition to lines 902, 904, 906, and 908. For example, reference point 910 may be a selected point within framework 900. Of course, reference point 910 may be placed and/or selected at any convenient location. For example, without limitation, reference point 910 may coincide with a true position, an endpoint of an edge, or any other suitable location.

Figure 10:
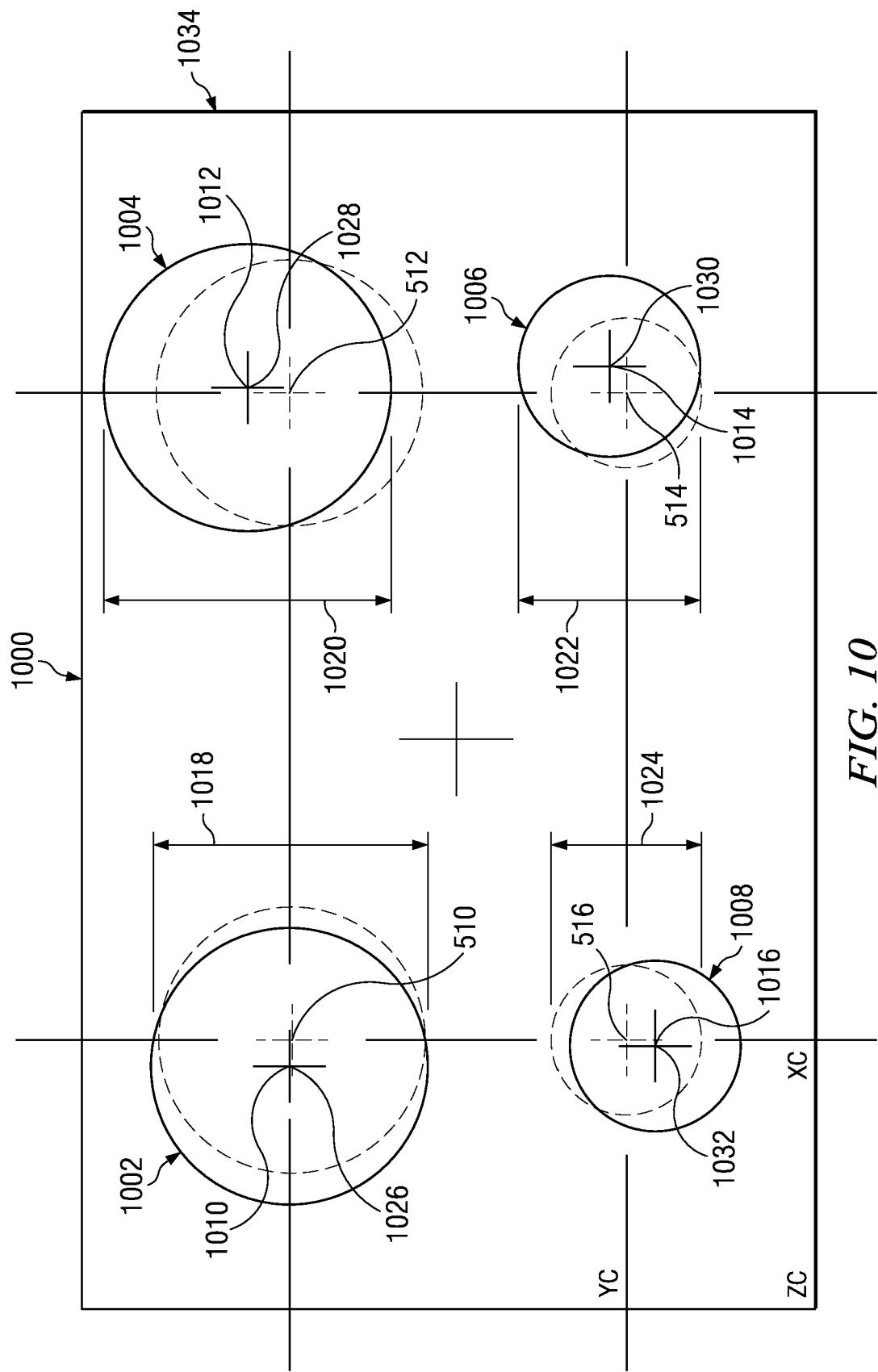
FIG. 10 is a diagram illustrating a manufactured part in accordance with an advantageous embodiment.

With reference now to FIG. 10, a diagram illustrating a manufactured part is depicted in accordance with an advantageous embodiment. In this example, manufactured part 1000 is a part that may be generated using part 500. Manufactured part 1000 may be a produced physical part and/or a simulated part.

In this example, manufactured holes 1002, 1004, 1006 and 1008 may be production holes corresponding to holes 502, 504, 506 and 508 for part 500. When manufactured holes 1002, 1004, 1006 and 1008 take the form of simulated holes, these simulations may be generated to provide a model to analyze variations for part 500. When manufactured holes 1002, 1004, 1006 and 1008 are physical holes, these holes may provide data for analysis.

In this example, manufactured holes 1002, 1004, 1006 and 1008 may have manufactured hole centers 1010, 1012, 1014 and 1016, respectively. Further, these holes also have actual sizes 1018, 1020, 1022 and 1024. Based on the centers, actual positions 1026, 1028, 1030 and 1032 on manufactured part 1000 may be identified.

As can be seen in this example, manufactured holes 1002, 1004, 1006 and 1008 may have deviations from holes 502, 504, 506 and 508. These deviations may include deviations between actual sizes 1018, 1020, 1022 and 1024 as compared to true sizes 518, 520, 522 and 524. As another example, manufactured hole centers 1010, 1012, 1014 and 1016 may vary from true centers 510, 512, 514 and 516. The variation in centers may result in actual positions 1026, 1028, 1030 and 1032 varying from true positions 526, 528, 530 and 532.

The deviations of an actual size to a true size may include, for example, without limitation, an actual size that is larger the true size, an actual size that is smaller than the true size, an actual size in which the hole has an inner surface roughness, and other suitable deviations.

Further, actual positions 1026, 1028, 1030 and 1032 may have deviations with respect to true positions 526, 528, 530 and 532 as to the location on surface 1034 on manufactured part 1000. The deviation in these actual positions also may be, for example, without limitation, a deviation in orientation. Further, the deviations within manufactured holes 1002, 1004, 1006 and 1008 may vary within the hole and/or may extend all the way through the depth of the hole. In other words, a hole may not extend all the way through a part.

These different deviations may be measured using various known techniques. For example, without limitation, data regarding dimensions and positions of manufactured holes 1002, 1004, 1006 and 1008 may be obtained using a coordinate measuring machine.

Figure 11:
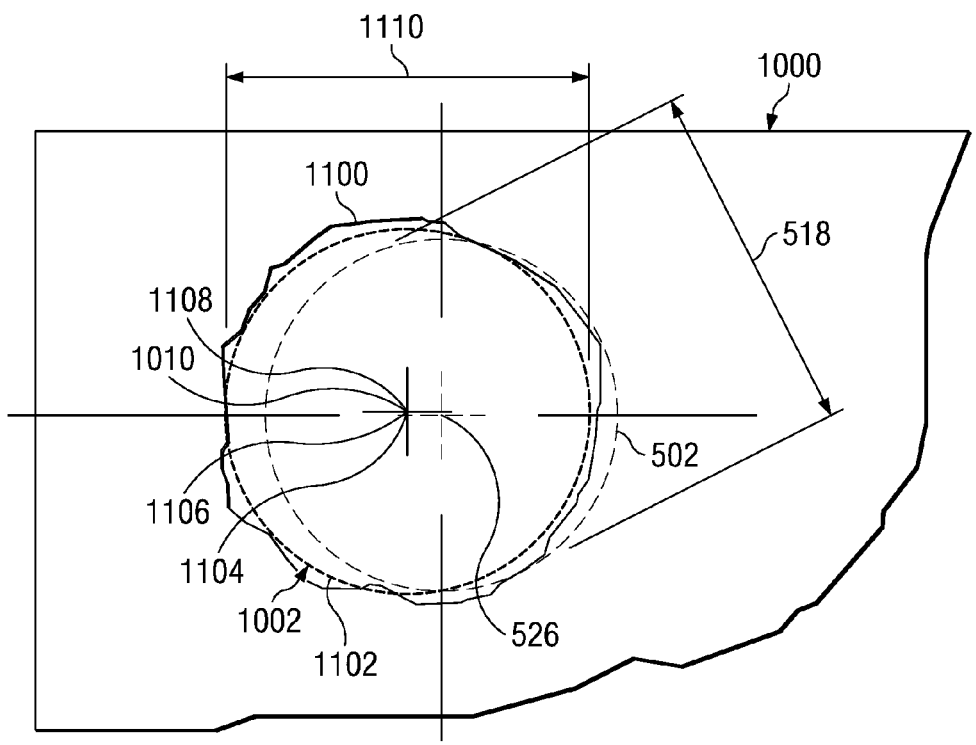
FIG. 11 is a diagram illustrating a physical manufactured hole in accordance with an advantageous embodiment.

With reference now to FIG. 11, a diagram illustrating a physical manufactured hole is depicted in accordance with an advantageous embodiment. In this example, a portion of manufactured part 1000 is illustrated showing manufactured hole 1002. In this example, manufactured hole 1002 may be shown with internal surface 1100. As illustrated, internal surface 1100 may not be an ideal and/or perfect geometric shape. For example, without limitation, manufactured hole 1002 may be egg-shaped and/or some irregular shape. The imperfections in internal surface 1100 of manufactured hole 1002 may be caused by manufacturing and/or fabrication processes.

Mating envelope 1102 may fit to internal surface 1100 with axis 1104 being used as center 1106 of internal surface 1100. Mating envelope 1102 may be an inscribing cylinder within manufactured hole 1002. As a result, fabrication variations may cause axis 1104 from mating envelope 1102 to have position 1108, which may be different from true position 526.

Further, in fitting internal surface 1100, mating envelope 1102 may have size 1110, which may be different from true size 518.

Figure 12:
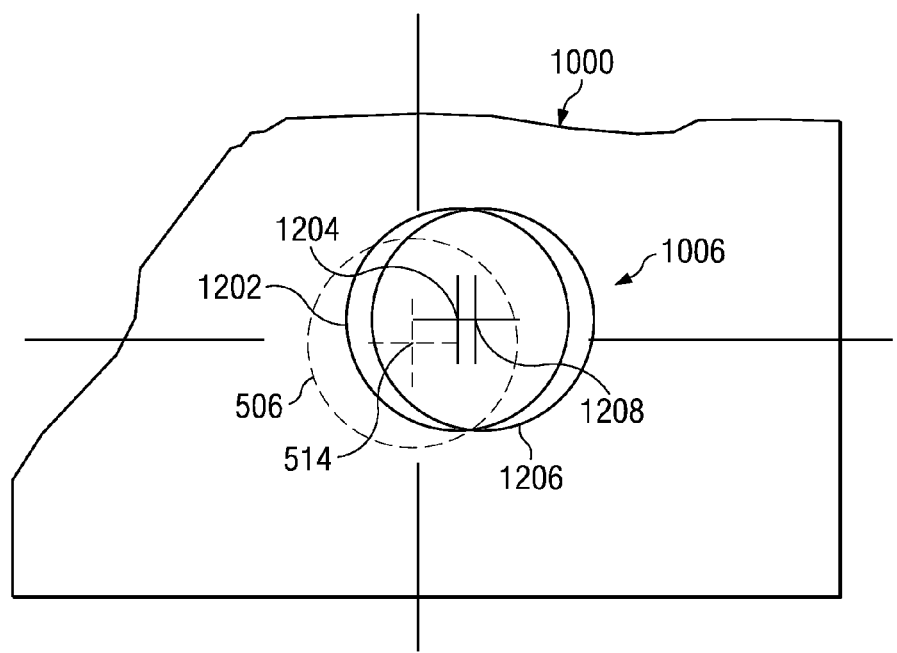
FIG. 12 is a diagram illustrating a manufactured hole having size orientation and location variations in accordance with an advantageous embodiment.
Figure 13:
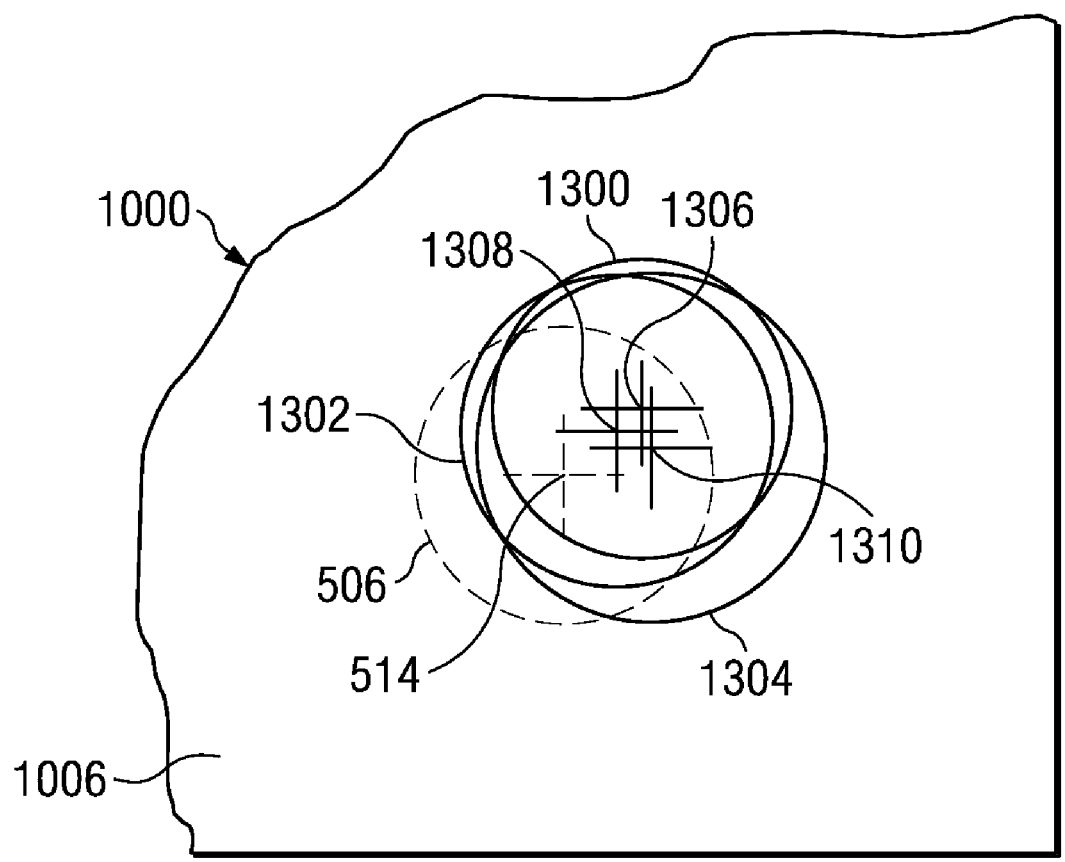
FIG. 13 is a diagram illustrating a hole having size, orientation, and location variations in accordance with an advantageous embodiment.

In FIGS. 12 and 13, a non-perpendicular or tilted hole may be present. With reference now to FIG. 12, a diagram illustrating a manufactured hole having size orientation and location variations is depicted in accordance with an advantageous embodiment. In this example, manufactured hole 1006 may have an orientation that may result in more than one center and/or more than one diameter for manufactured hole 1006.

In this example, manufactured hole 1006 has diameter 1202 that may be located at center 1204. In another extreme, manufactured hole 1006 may have diameter 1206, which may be located at center 1208. These two different diameters may occur based on the orientation of manufactured hole 1006.

With reference now to FIG. 13, a diagram illustrating a hole having size, orientation, and location variations is depicted in accordance with an advantageous embodiment. In this example, manufactured hole 1006 may have an irregularity resulting in diameters 1300, 1302, and 1304. These diameters may have corresponding centers 1306, 1308, and 1310.

Figure 14:
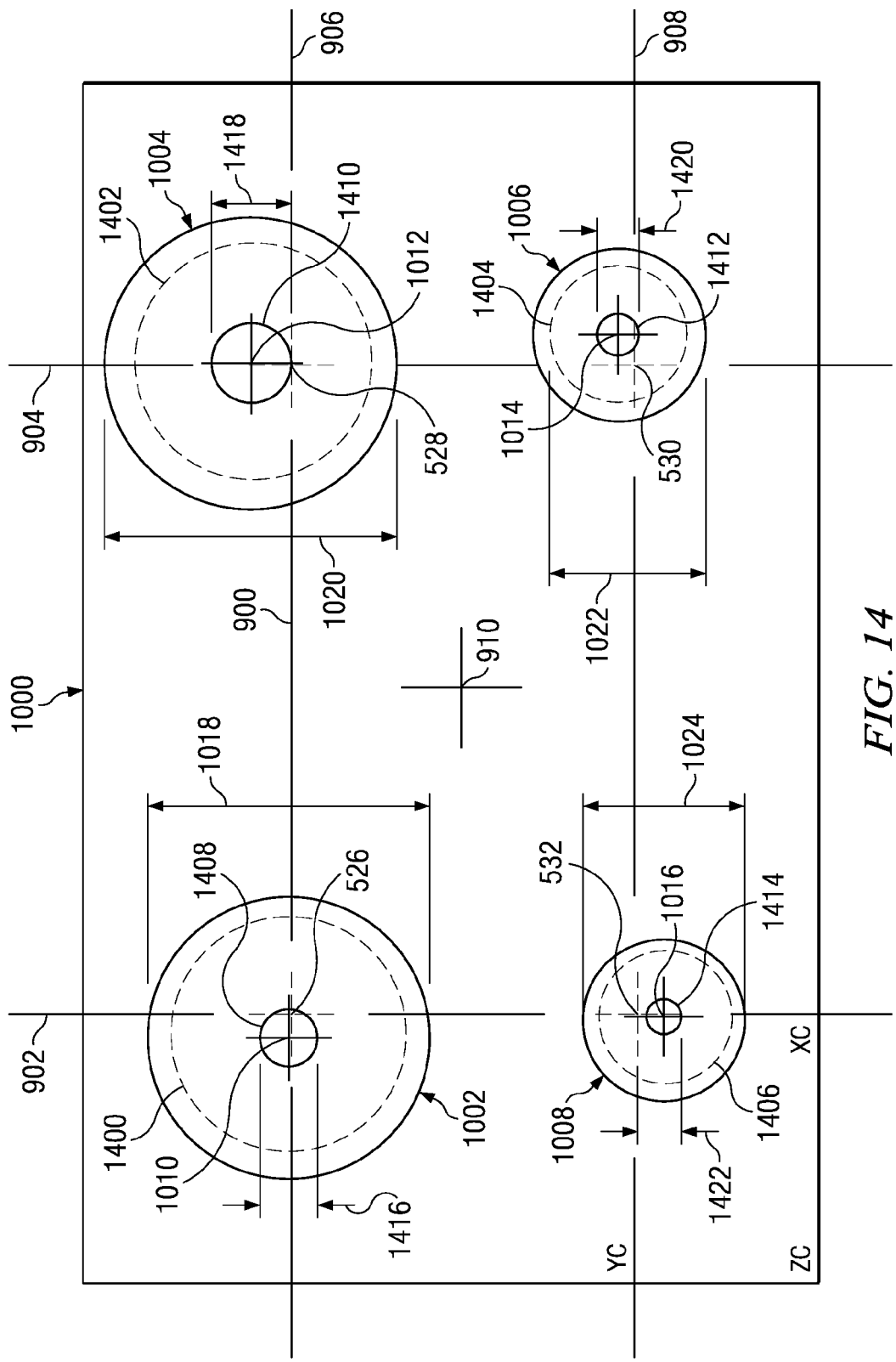
FIG. 14 is a diagram illustrating variations in holes in accordance with an advantageous embodiment.

With reference now to FIG. 14, a diagram illustrating variations in manufactured holes is depicted in accordance with an advantageous embodiment. In this example, size variations for manufactured holes 1002, 1004, 1006 and 1008 may be analyzed to identify a remaining clearance for these manufactured holes.

In this example, virtual condition diameter 1400 may be calculated for manufactured hole 1002; virtual condition diameter 1402 may be calculated for manufactured hole 1004; virtual condition diameter 1404 may be calculated for manufactured hole 1006; and virtual condition diameter 1406 may be calculated for manufactured hole 1008. These virtual condition diameters are examples of virtual condition size 463 in FIG. 4 and may be used only for calculation purposes. Although virtual condition cylinders are in theory, located on the feature-relating tolerance zone framework, circles representing virtual conditions may be for convenience of showing relative sizes shown centered on manufactured holes 1002, 1004, 1006, and 1008.

In these examples, clearance circles 1408, 1410, 1412 and 1414 may have diameters 1416, 1418, 1420 and 1422, respectively. These diameters may be calculated as the manufactured diameter minus the virtual condition diameter for the particular feature.

Virtual condition diameters may be calculated using commonly known procedures based on American Society of Mechanical Engineers standard ASME Y14.5. In this example, virtual condition diameters 1400, 1402, 1404 and 1406 are shown as being slightly smaller than manufactured holes 1002, 1004, 1006 and 1008.

In these examples, clearance circle 1408 may be a circle that may be equal to virtual condition diameter 1400 for manufactured hole 1002 subtracted from actual size 1018. In a similar fashion, clearance circle 1410 may result from subtracting virtual condition diameter 1402 from actual size 1020 for hole 1004.

Clearance circle 1412 may be generated from subtracting virtual condition diameter 1404 from actual size 1022 for hole 1006. Clearance circle 1414 may be the result of subtracting virtual condition diameter 1406 from actual size 1024 for hole 1008. Clearance circles 1408, 1410, 1412 and 1414 may be centered on manufactured hole centers 1010, 1012, 1014 and 1016, respectively. In these examples, actual sizes 1018, 1020, 1022, and 1024 may be in the form of diameters.

Figure 15:
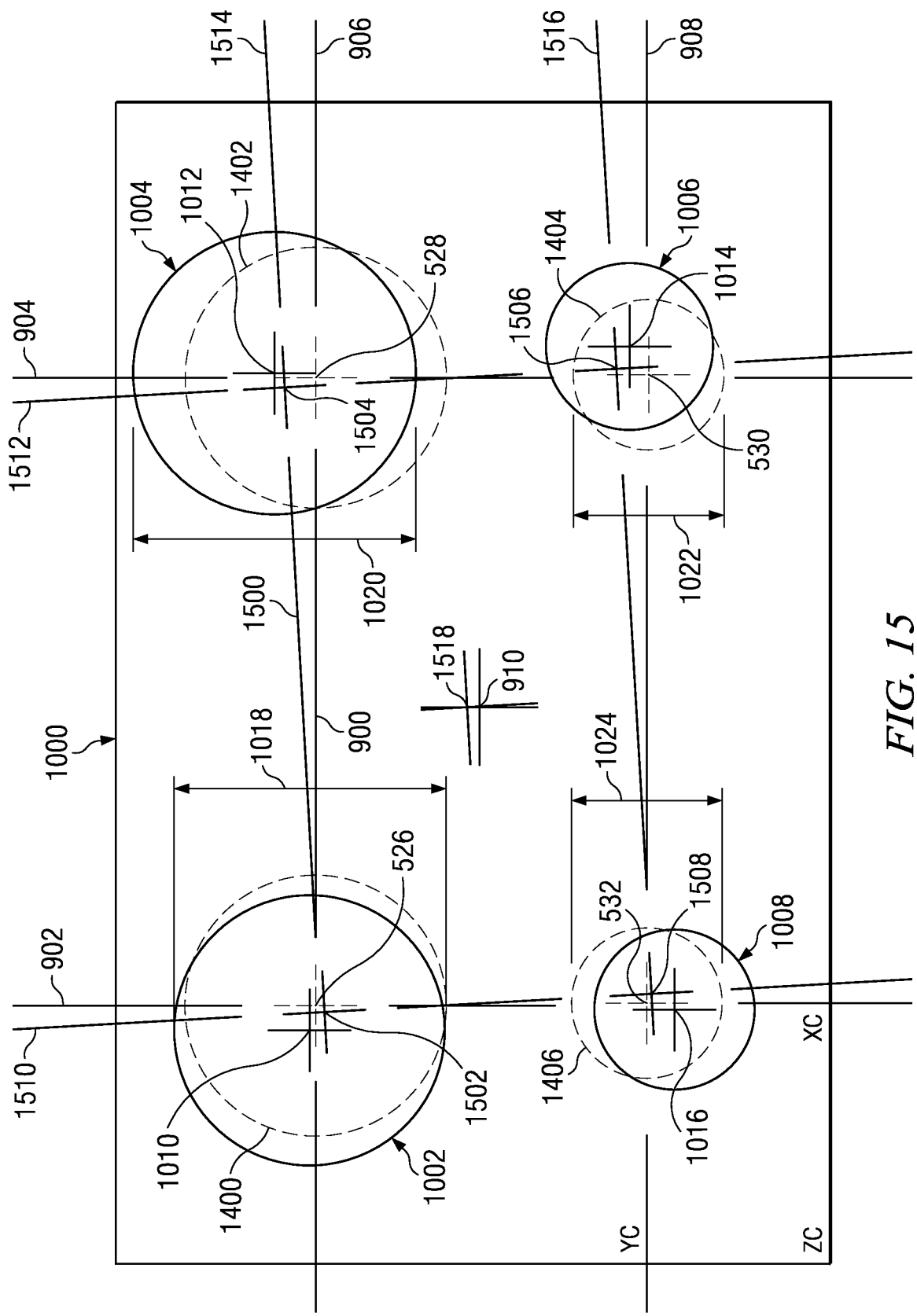
FIG. 15 is a diagram illustrating a best-fit tolerance zone framework in accordance with an advantageous embodiment.

With reference now to FIG. 15, a diagram illustrating a best-fit feature-relating tolerance zone framework is depicted in accordance with an advantageous embodiment. Best-fit framework 1500 may be used to identify positional errors of manufactured holes 1002, 1004, 1006, and 1008 calculating locations of manufactured hole centers 1010, 1012, 1014, and 1016 relative to true positions 1502, 1504, 1506, and 1508 of the framework.

Best-fit framework 1500 may be created from a transformation of framework 900. This transformation may include, for example, without limitation, a translation and/or rotation relative to framework 900. In other words, best-fit framework 1500 may result from moving framework 900 from its position as identified using true positions 526, 528, 530 and 532. Best-fit framework 1500 may include lines 1510, 1512, 1514, and 1516. Further, best-fit framework 1500 also may have reference point 1518.

As can be seen in this illustration, these different lines and the reference point may be translated or shifted relative to the lines and reference point for framework 900. In this illustrative example, best-fit framework 1500 may include transformed true positions 1502, 1504, 1506, and 1508. These transformed true positions are positions are the theoretical true centers within best-fit framework 1500.

These transformed true centers may be positioned relative to centers 1010, 1012, 1014 and 1016 for manufactured holes 1002, 1004, 1006 and 1008.

The movement of framework 900 to form best-fit framework 1500 may occur in a manner that retains the structure of framework 900 in its new position to form best-fit framework 1500. Various best-fit methods may be used depending on the particular implementation. For example, without limitation, a least squares method, a total least squares method, or some other suitable method may be used.

A comparison of framework 900 to best-fit framework 1500 may indicate an amount of transformation between the designed features and the actual manufactured features. These differences may be used to identify a portion of the positional errors for the pattern of features.

In these depicted examples, the translation and rotation of a pattern of features, such as those shown in manufactured part 1000, may be relative to an origin located at, but not limited to, a true position of a circle, an edge of a manufactured part, a corner of a manufactured part, a location of a part to be mated with a manufactured part, or some other suitable location.

Figure 16:
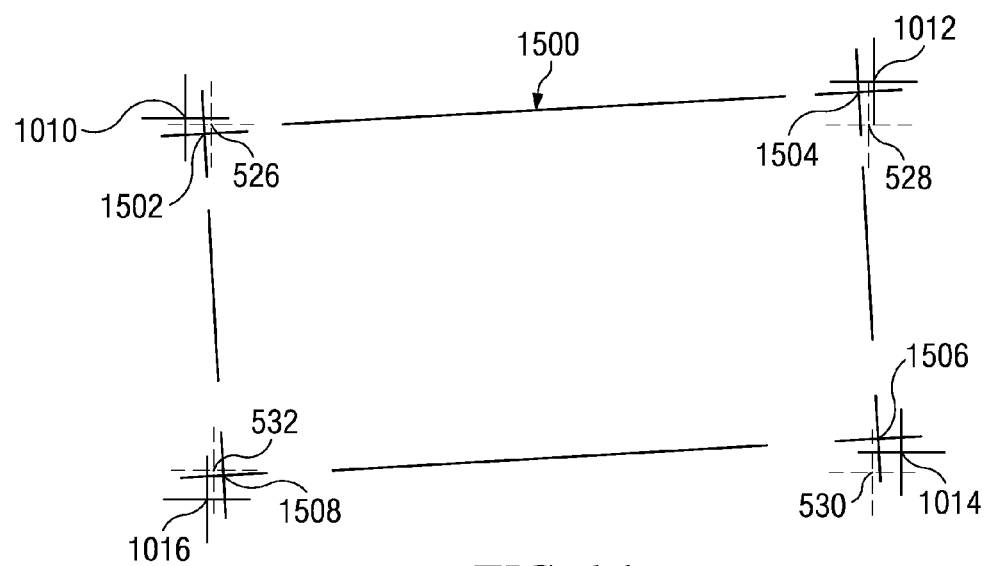
FIG. 16 is a diagram illustrating a best-fit tolerance zone framework and centers of holes in accordance with an advantageous embodiment.

With reference now to FIG. 16, a diagram illustrating a best-fit tolerance zone framework and centers of holes is depicted in accordance with an advantageous embodiment. In this example, best-fit framework 1500 is illustrated as offset from true positions 526, 528, 530 and 532. Further, best-fit framework 1500 also may be offset from centers 1010, 1012, 1014 and 1016 for manufactured holes 1002, 1004, 1006 and 1008 (not shown).

Best-fit framework 1500 may establish transformed true positions for the manufactured circles. Transformed true positions 1502, 1504, 1506, and 1508 in best-fit framework 1500 may represent a transformation of true positions 526, 528, 530 and 532. In this example, the transformation may include a translation and a rotation of these positions.

Figure 17:
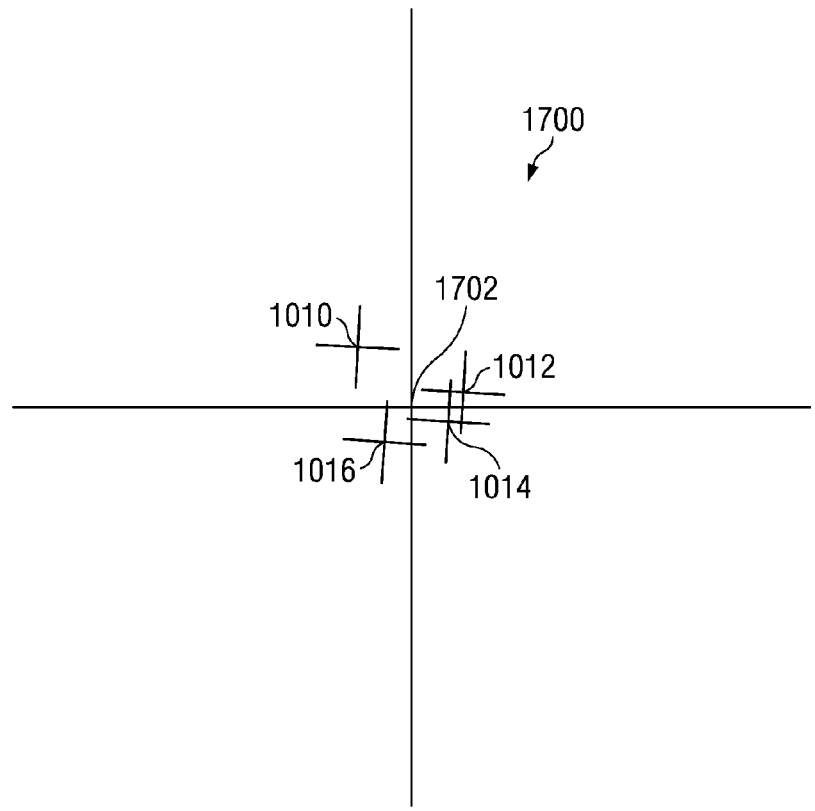
FIG. 17 is a diagram illustrating organizing of positions in accordance with an advantageous embodiment.

With reference now to FIG. 17, a diagram illustrating organizing of positions is depicted in accordance with an advantageous embodiment. In this example, plot 1700 illustrates true position 1702, which may be a true position for each of transformed true positions 1502, 1504, 1506, and 1508. In other words, true position 1702 may be formed from an organization of transformed true positions 1502, 1504, 1506, and 1508 into a single position and/or location of true position 1702.

Centers 1010, 1012, 1014 and 1016 for manufactured holes 1002, 1004, 1006 and 1008 (not shown) are organized relative to true position 1702 on plot 1700.

Figure 18:
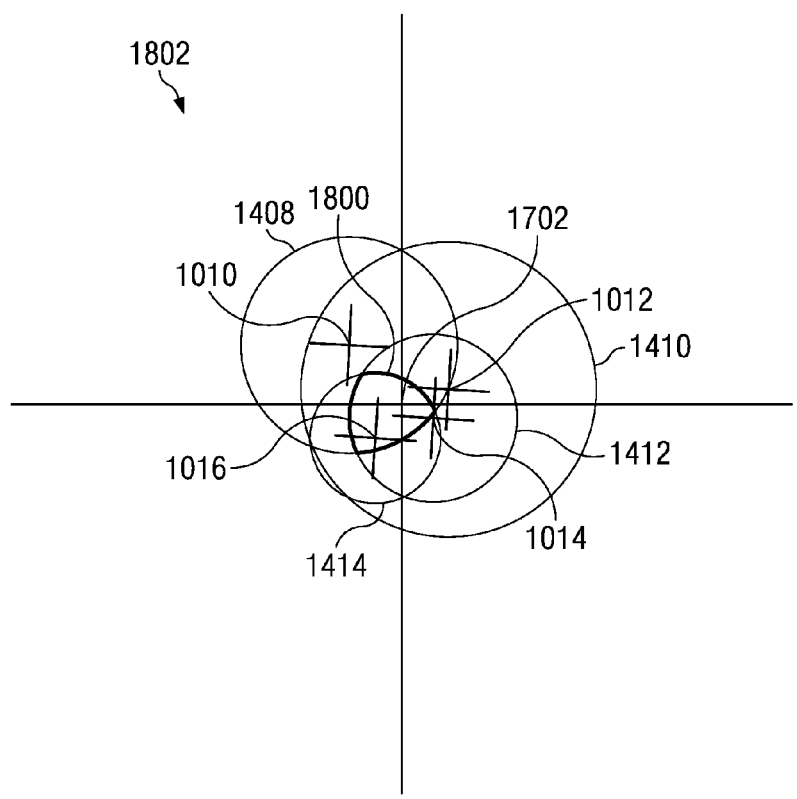
FIG. 18 is a diagram illustrating clearance circles in accordance with an advantageous embodiment.

With reference now to FIG. 18, a diagram illustrating clearance circles is depicted in accordance with an advantageous embodiment. In this example, common region 1800 may be present in plot 1802 between the intersection of clearance circles 1408, 1410, 1414, and 1416. Common region 1800 may be a minimum remaining float. In this example, clearance circles 1408, 1410, 1412, and 1414 are shown with corresponding hole centers 1010, 1012, 1014 and 1016 with respect to true position 1702.

The remaining float in common region 1800 may indicate the amount of clearance that is available between the virtual condition sizes and the manufactured holes considering all holes simultaneously. This value establishes both the minimum amount of clearance that will exist in an assembled condition and also the minimum amount of movement that may be attributed to the manufactured features in this part when the part is assembled.

Figure 19:
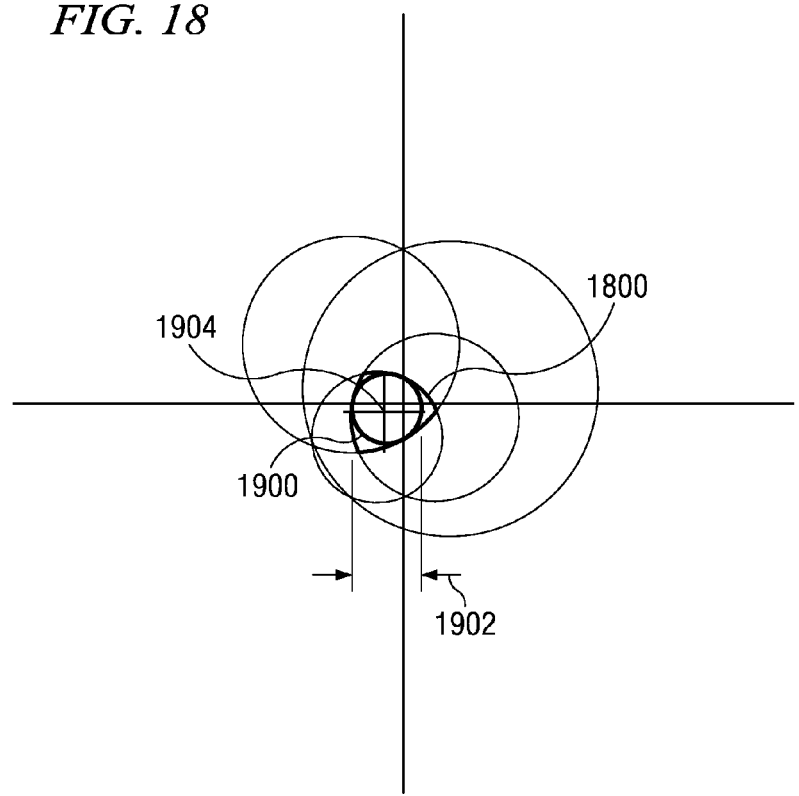
FIG. 19 is a diagram illustrating a remaining float circle in accordance with an advantageous embodiment.

With reference now to FIG. 19, a diagram illustrating a remaining float circle is depicted in accordance with an advantageous embodiment. In this example, maximum inscribed circle 1900 may be created having diameter 1902. In this example, diameter 1902 may have a size that is as large as possible within common region 1800 defined by clearance circles 1408, 1410, 1412 and 1414. Center 1904 of maximum inscribed circle 1900 may be compared to true position 1702 to identify an amount for additional translation 478 of the pattern or features relative to best-fit framework 1500 (not shown).

Further, diameter 1902 of maximum inscribed circle 1900 may be the minimum amount of float available relative to allowable virtual conditions for the pattern or features. In this example, a virtual condition may be the collective effects of a maximum material condition and the specific geometric tolerance for that material condition.

In these illustrative examples, for a feature in the form of a hole, the virtual condition may be equal to the specified maximum material condition minus the positional tolerance for that hole. Positional tolerance may be the specified amount of variation for a feature relative to the true position for that feature. The specified condition is the smallest specified limit of size for the hole. The specified condition may be defined as the condition in which a feature of size may contain the maximum amount of material within the designed limits of size.

For example, without limitation, the maximum amount of material may be a minimum hole diameter for a hole. By minimizing the hole diameter, the amount of material may be maximized. The least material condition may be defined as a condition in which the feature of size contains the least amount of material within the stated limits of size. For example, without limitation, a hole may have a least material condition when the hole has a maximum diameter. The illustration of parts, frameworks, and other processing in FIGS. 5-19 to identify a minimum float is presented for purposes of illustrating one manner in which an analysis may be made.

The illustration of the processing in these figures is not meant to imply physical or architectural limitations to a manner in which other advantageous embodiments may be implemented. For example, with other advantageous embodiments, parts may take other shapes. For example, without limitation, parts may be square, octagonal, circular, irregular, or other suitable shapes in addition to the rectangular plate illustrated for parts 500 and 700. Additionally, frameworks and other advantageous embodiments may include other points in addition or in place of the ones shown in these examples.

Figure 20:
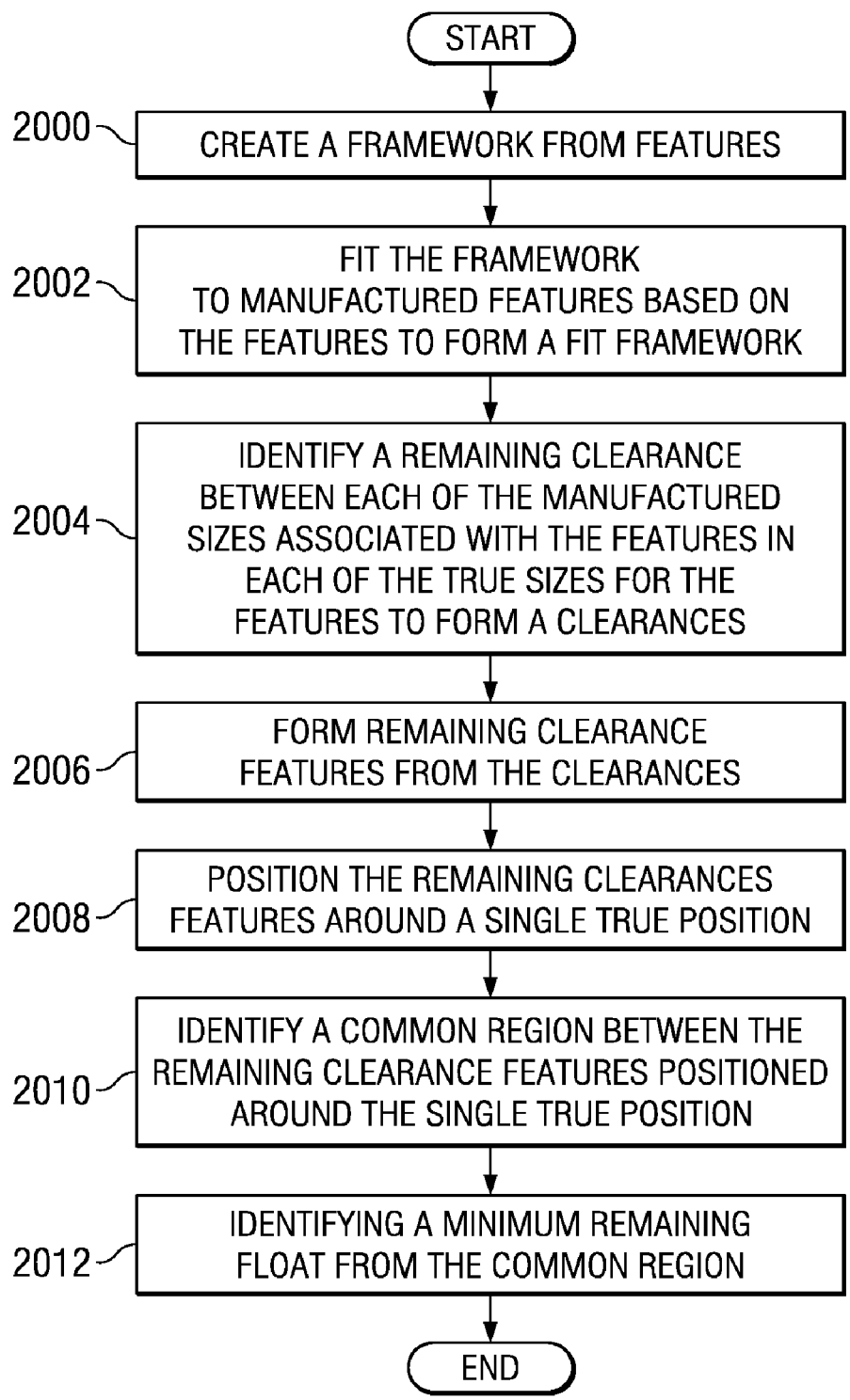
FIG. 20 is a high-level flowchart of a process for identifying a minimum remaining float for internal manufactured features in accordance with an advantageous embodiment.

With reference now to FIG. 20, a high-level flowchart of a process for identifying a minimum remaining float for internal manufactured features is depicted in accordance with an advantageous embodiment. The process illustrated in FIG. 20 may be implemented in a software component such as, for example, without limitation, feature analysis process 402 in FIG. 4.

The process may begin by creating a framework from the features (operation 2000). Thereafter, the process may fit the framework to manufactured features based on the features for the part to form a fit framework (operation 2002). The process may identify a remaining clearance between each of the manufactured sizes associated with the features in each of the virtual conditions for the features to form clearances (operation 2004). Remaining clearance features may then be formed from the clearances (operation 2006).

The process may then position the remaining clearance features around a single true position (operation 2008). A common region between the remaining clearance features positioned around the single true position may be identified (operation 2010). The process may then identify a minimum remaining float from the common region (operation 2012), with the process terminating thereafter.

Figure 21:
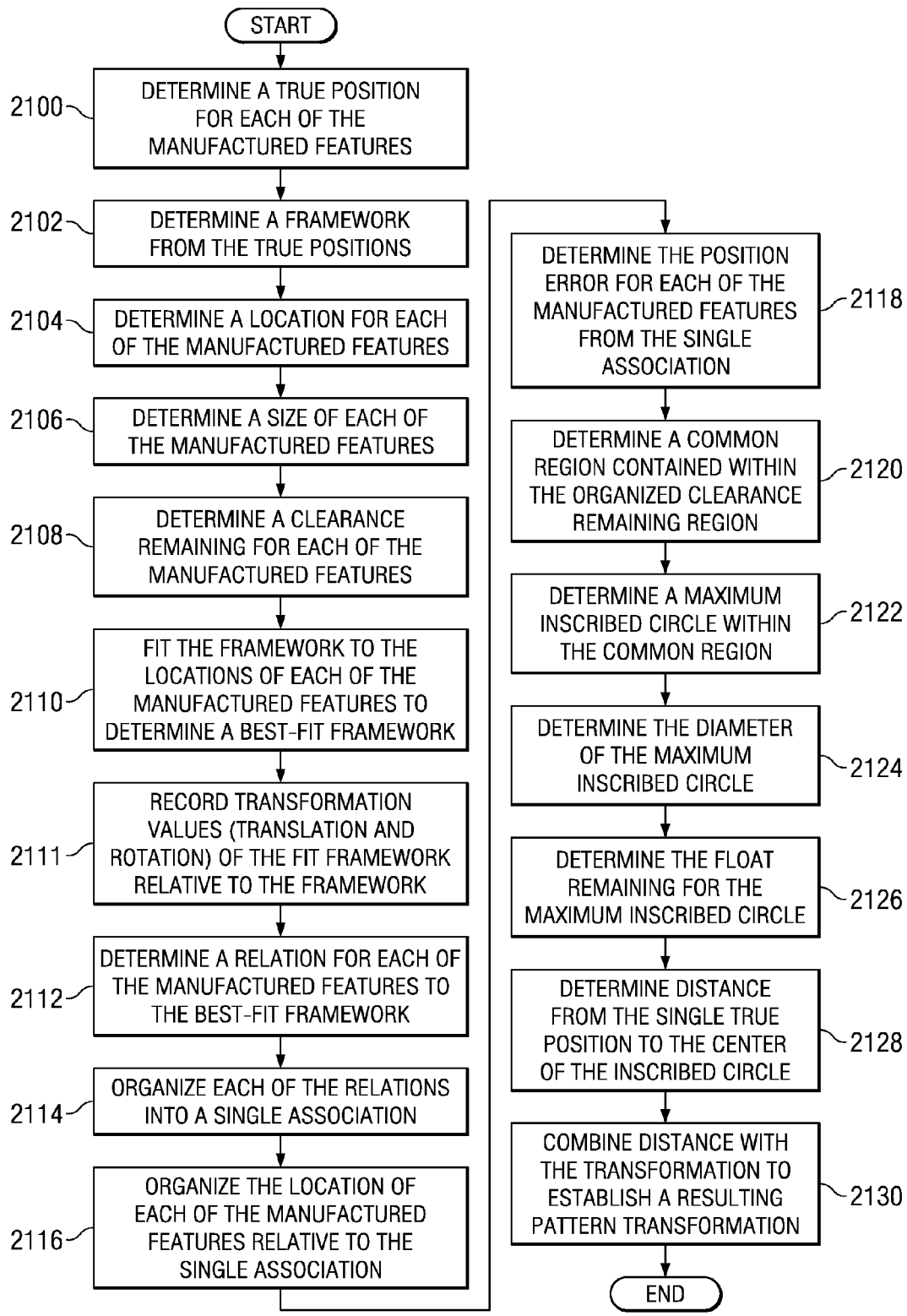
FIG. 21 is a flowchart of a process for identifying positional error and remaining feature tolerances for a pattern of internal features on an object in accordance with an advantageous embodiment.

With reference now to FIG. 21, a flowchart of a process for identifying positional error and remaining feature tolerances for a pattern of internal features on an object is depicted in accordance with an advantageous embodiment. The process illustrated in FIG. 21 may be implemented in a software component such as, for example, without limitation, feature analysis process 402 in FIG. 4. In these examples, this process may be used to analyze internal features such as, for example, without limitation, a pattern of holes on a part.

The process may begin by determining a true position for each of the manufactured features (operation 2100). In this example, operation 2100 may identify the true position for a manufactured feature, such as a manufactured hole, based on the planned or designed location of the hole. The true position may be identified as an origin for a hole. The origin may be the center of the hole. Thereafter, the process may determine a framework from the true positions (operation 2102). In this example, a framework, such as, for example, without limitation, framework 900, may be generated from the true positions.

The process may determine the location for each of the manufactured features (operation 2104). In operation 2104, the location of the manufactured features may be, for example, the actual positions of the manufactured holes. The process may determine a size of each of the manufactured features (operation 2106).

The process may determine a clearance remaining for each of the manufactured features (operation 2108). In this example, the virtual condition diameter and/or size of a hole may be subtracted from the manufactured size of the hole. The difference between these two sizes forms a clearance remaining for each of the features. This clearance may take the form of a clearance circle. The process may fit the framework to the locations of each of the manufactured features to determine a best-fit framework (operation 2110).

The process may then determine the transformation of the best-fit framework relative to the original location of the framework (operation 2111). The process may determine a relation for each of the manufactured features to the best-fit framework (Operation 2112). The location of the centers for manufactured holes may be determined relative to the best-fit framework.

The process may organize each of the relations into a single association (operation 2114). Operation 2114 may generate a plot similar to plot 1700 in FIG. 17 in which a single true position is present around which the other positions and/or features may be oriented and/or placed. The process may then organize the location of each of the manufactured features relative to a single association (operation 2116). Operation 2116 may result in a plot similar to plot 1700 in FIG. 17. The process may then determine the position error for each of the manufactured features from a single association (operation 2118). Operation 2118 may be performed as illustrated in plot 1802 in FIG. 18.

The process may determine a common region contained within the organized clearance remaining region (operation 2120). Operation 2120 may be identified as shown in plot 1802 in FIG. 18.

The process may determine a maximum inscribed circle within the common region (operation 2122). This maximum inscribed circle may be determined using the common region from the clearance remaining circles in operation 2120. The process may determine the diameter of the maximum inscribed circle (operation 2124). The process may then determine the float remaining from the maximum inscribed circle (operation 2126).

A distance may be determined from the single true position to the center of the inscribed circle (operation 2128). The distance may be, as an example, without limitation, combined with the transformation to establish the resulting pattern transformation 476 (operation 2130), with the process terminating thereafter. In operation 2130, resulting pattern transformation 476 may be a transformation of the inscribed circle within the common region.

The different advantageous embodiments can take the form of an entirely hardware embodiment, an entirely software embodiment, or an embodiment containing both hardware and software elements. Some embodiments are implemented in software, which include but are not limited to forms, such as, for example, without limitation, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art.

For example, without limitation, the different advantageous embodiments may be applied to manufacturing and/or repairing parts for many different types of objects. For example, without limitation, other advantageous embodiments may be applied to a mobile platform, a stationary platform, a land-based structure, an aquatic-based structure, a space-based structure, and/or some other suitable object.

More specifically, the different advantageous embodiments may be applied to, for example, without limitation, an aircraft, a submarine, a bus, a personnel carrier, a tank, a train, an automobile, a spacecraft, a surface ship, a power plant, a manufacturing facility, and/or a building. For example, although the different advantageous embodiments have been described with respect internal features, some advantageous embodiments may be applicable to external features, such as, for example, without limitation, pins.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for analyzing tolerances for a plurality of features for an object, the computer-implemented method comprising:
   creating a framework from the plurality of features for the object;
   fitting the framework to a plurality of manufactured internal features for the object based on the plurality of features to form a fit framework;
   forming, by a processor of a computer, a plurality of remaining clearances by subtracting each of a plurality of virtual condition sizes associated with the plurality of manufactured internal features from each of the plurality of manufactured sizes for the plurality of features to form the plurality of remaining clearances, wherein each of the plurality of virtual condition sizes is calculated by subtracting one of a plurality of geometric tolerances from one of a plurality of specified maximum material sizes;
   forming, by the processor, a plurality of remaining clearance features from the plurality of remaining clearances, each of the plurality of remaining clearance features including a circle with a diameter substantially equal to a corresponding remaining clearance;
   positioning the plurality of remaining clearance features around a single true position;
   identifying a common region from between the plurality of remaining clearance features positioned around the single true position; and
   identifying a minimum remaining float from the common region.

2. The method of claim 1, wherein the step of positioning the plurality of remaining clearance features around the single true position comprises:
   organizing a plurality of relations into a single association; and
   organizing a plurality of locations for the plurality of manufactured internal features relative to the single association.

3. The method of claim 2, wherein the step of organizing the plurality of relations into the single association comprises:
   superimposing a plurality of transformed true positions into the single true position to form the single association.

4. The method of claim 3, wherein the step of organizing the plurality of locations for the plurality of manufactured internal features relative to the single association comprises:
   placing the remaining clearance for the each of the plurality of manufactured internal features relative to the single association.

5. The method of claim 1, wherein the step of creating the framework comprises:
   determining a true position for each of the plurality of manufactured internal features to form a plurality of true positions; and
   forming the framework from the plurality of true positions.

6. The method of claim 5, wherein the step of determining the true position for the each of the plurality of manufactured internal features to form the plurality of true positions comprises:
   determining positional tolerances of the each of the plurality of manufactured internal features;
   determining size tolerances of the each of the plurality of manufactured internal features; and
   selecting an origin for the each of the plurality of manufactured internal features to form the plurality of true positions.

7. The method of claim 1, wherein the step of forming the plurality of remaining clearances further comprises:
   determining a location for each of the plurality of manufactured internal features to form a plurality of locations;
   wherein a geometric tolerance includes a form, an orientation, or a position tolerance.

8. The method of claim 1, wherein the step of identifying the minimum remaining float from the common region comprises:

determining a maximum inscribed circle within the common region;

determining a diameter for the maximum inscribed circle;

determining a center location of the maximum inscribed circle;

determining a transformation of the center location of the maximum inscribed circle from a single association; and determining the minimum remaining float from the maximum inscribed circle.

9. The method of claim 1, wherein the plurality of manufactured internal features is a plurality of holes.

10. The method of claim 1, wherein the step of fitting the framework to the plurality of manufactured internal features for the object based on the plurality of features to form the fit framework comprises:

determining a center for the each of the plurality of manufactured internal features to form a plurality of centers for the plurality of manufactured internal features; and best fitting a plurality of true positions of the plurality of manufactured internal features to the plurality of centers.

11. A data processing system comprising:

a bus;

a communications unit connected to the bus;

a non-transitory computer readable storage medium connected to the bus;

a processor unit connected to the bus and to a computer readable memory;

first program instructions to create a framework from a plurality of features for an object;

second program instructions to fit the framework to a plurality of manufactured internal features for the object based on the plurality of features to form a fit framework;

third program instructions to form a plurality of remaining clearances by subtracting each of a plurality of virtual condition sizes associated with the plurality of manufactured internal features from each of the plurality of manufactured sizes for the plurality of features to form the plurality of remaining clearances, wherein each of the plurality of virtual condition sizes for the plurality of internal manufactured features is calculated by subtracting one of a plurality of geometric tolerances from one of a plurality of specified maximum material sizes minus any specified geometric tolerances, and wherein each of the plurality of geometric tolerances is a form tolerance, an orientation tolerance, or a position tolerance;

fourth program instructions to form a plurality of remaining clearance features from the plurality of remaining clearances, each of the plurality of remaining clearance features including a circle with a diameter substantially equal to a corresponding remaining clearance;

fifth program instructions to position the plurality of remaining clearance features around a single true position;

sixth program instructions to identify a common region from between the plurality of remaining clearance features positioned around the single true position; and seventh program instructions to identify a minimum remaining float from the common region;

wherein the first through the seventh program instructions are stored on the non-transitory computer readable storage medium for execution by the processor via the computer readable memory.

12. The data processing system of claim 11, further comprising:

eighth program instructions to determine a true position for each of the plurality of manufactured internal features to form a plurality of true positions; and ninth program instructions to form the framework from the plurality of true positions;

wherein the eighth and ninth program instructions are stored on the computer readable storage medium for execution by the processor via the computer readable memory.

13. The data processing system of claim 11, further comprising:

tenth program instructions to determine a location for each of the plurality of manufactured internal features to form a plurality of locations and eleventh program instructions to determine a size of the each of the plurality of manufactured internal features to form a plurality of sizes;

wherein the program instructions are stored on the computer readable storage medium for execution by the processor via the computer readable memory.

14. The data processing system of claim 11, further comprising:

twelfth program instructions to organize a plurality of relations into a single association; and thirteenth program instructions to organize a plurality of locations for the plurality of manufactured internal features relative to the single association to form a plurality of organized manufactured internal features;

wherein the twelfth and thirteenth program instructions are stored on the computer readable storage medium for execution by the processor via the computer readable memory.

15. The data processing system of claim 11, further comprising:

fourteenth program instructions to determine a maximum inscribed circle within the common region;

fifteenth program instructions to determine a diameter for the maximum inscribed circle;

sixteenth program instructions to determine a center location of the maximum inscribed circle; and seventeenth program instructions to determine a transformation of the center location of the maximum inscribed circle from a single association, and seventeenth program instructions to determine the minimum remaining float from the maximum inscribed circle;

wherein the fourteenth through the eighteenth program instructions are stored on the computer readable storage medium for execution by the processor via the computer readable memory.

16. A non-transitory computer recordable storage medium encoded with a computer program product for analyzing tolerances for a plurality of features for an object, the computer program product comprising:

first program instructions for creating a framework from the plurality of features for the object;

second program instructions for fitting the framework to a plurality of manufactured internal features for the object based on the plurality of features to form a fit framework;

third program instructions for forming a plurality of remaining clearances by subtracting each of a plurality of virtual condition sizes associated with the plurality of manufactured internal features from each of the plurality of manufactured sizes for the plurality of features to form the plurality of remaining clearances, wherein each of the plurality of virtual condition sizes for each of the plurality of internal manufactured features is calculated by subtracting one of a plurality of geometric tolerances from one of a plurality of specified maximum material sizes, and wherein each of the plurality of geometric tolerances tolerance is a form tolerance, an orientation tolerance, or a position tolerance;

fourth program instructions for forming a plurality of remaining clearance features from the plurality of remaining clearances, each of the plurality of remaining clearance features including a circle with a diameter substantially equal to a corresponding remaining clearance;

fifth program instructions for positioning the plurality of remaining clearance features around a single true position;

sixth program instructions for identifying a common region from between the plurality of remaining clearance features positioned around the single true position; and seventh program instructions for identifying a minimum remaining float from the common region;

wherein the first through the seventh program instructions are stored on the computer readable storage medium for execution by the processor via the computer readable memory.

17. The non-transitory computer recordable storage medium encoded with the computer program product of claim 16, the computer program product further comprising:
eighth program instructions for determining a true position for each of the plurality of manufactured internal features to form a plurality of true positions; and
ninth program instructions for forming the framework from the plurality of true positions;
wherein the eighth and ninth program instructions are stored on the computer readable storage medium for execution by the processor via the computer readable memory.

18. The non-transitory computer recordable storage medium encoded with the computer program product of claim 16, the computer program product further comprising:
tenth program instructions for determining a location for each of the plurality of manufactured internal features to form a plurality of locations; and
eleventh program instructions for determining a size of the each of the plurality of manufactured internal features to form a plurality of sizes;
wherein the tenth and the eleventh program instructions are stored on the computer readable storage medium for execution by the processor via the computer readable memory.

19. The non-transitory computer recordable storage medium encoded with the computer program product of claim 16, the computer program product further comprising:
twelfth program instructions for organizing a plurality of relations into a single association; and
thirteenth program instructions for organizing a plurality of locations for the plurality of manufactured internal features relative to the single association to form a plurality of organized manufactured internal features;
wherein the twelfth and the thirteenth program instructions are stored on the computer readable storage medium for execution by the processor via the computer readable memory.

20. The non-transitory computer recordable storage medium encoded with the computer program product of claim 16, the computer program product further comprising:

fourteenth program instructions program code, stored on the computer recordable storage medium, for determining a maximum inscribed circle within the common region;

fifteenth program instructions program code, stored on the computer recordable storage medium, for determining a diameter for the maximum inscribed circle;

sixteenth program instructions program code, stored on the computer recordable storage medium, for determining a center location of the maximum inscribed circle;

seventeenth program instructions program code, stored on the computer recordable storage medium, for determining a transformation of the center location of the maximum inscribed circle from a single association; and eighteenth program instructions program code, stored on the computer recordable storage medium, for determining the minimum remaining float from the maximum inscribed circle;

wherein the fourteenth through the eighteenth program instructions are stored on the computer readable storage medium for execution by the processor via the computer readable memory.

21. A method for determining a minimum remaining float for a manufactured part having a plurality of manufactured holes, the method comprising:
responsive to one of the plurality of manufactured holes having a first specified maximum material size and another of the plurality of manufactured holes having a second specified maximum material size, forming, by a processor of a computer, a plurality of circles from each of a plurality of diameters and positioning the plurality of circles around a single true position, wherein each of the plurality of diameters are calculated by subtracting each of a plurality of virtual condition size diameters from each of a plurality of corresponding manufactured size diameters, wherein each of the virtual condition size diameters are calculated by subtracting one of a plurality of geometric tolerances from one of a plurality of specified maximum material sizes; and
fitting, by the processor, an inscribed circle inside a common region of the plurality of circles, wherein the diameter of the inscribed circle is the minimum remaining float for the number of manufactured holes.

22. The method of claim 21, further comprising:
wherein the virtual condition size for a manufactured hole includes a true size.

23. The method of claim 21, further comprising:
using the minimum remaining float to determine whether a pattern of the plurality of manufactured holes meets a plurality of tolerance requirements specified in a design document for the manufactured part and to determine whether the plurality of manufactured holes on the manufactured part will connect to a plurality of pins on another manufactured part, wherein the each of the plurality of geometric tolerances is a specified form tolerance, a specified orientation tolerance, or a specified position tolerance.

24. A non-transitory computer recordable storage medium encoded with a computer program product for analyzing tolerances for a plurality of holes for an object, the computer program product comprising:
first program instructions for determining positional tolerances of each of a plurality of manufactured holes;
second program instructions for determining size tolerances of the each of the plurality of manufactured holes;

third program instructions for selecting an origin for each of the plurality of manufactured holes to form a plurality of true positions;

fourth program instructions for forming a framework from the plurality of true positions;

fifth program instructions for fitting the framework to the plurality of manufactured holes for the object based on the plurality of holes to form a fit framework;

sixth program instructions for determining a size of each of the plurality of manufactured holes to form a plurality of manufactured sizes;

seventh program instructions for forming a plurality of remaining clearances by subtracting each of a plurality of virtual condition sizes associated with the plurality of manufactured holes from each of the plurality of manufactured sizes for each of the plurality of manufactured holes to form the plurality of remaining clearances, wherein each of the plurality of virtual condition sizes for the plurality of manufactured holes is calculated by subtracting one of a plurality of geometric tolerances from one of a plurality of specified maximum material sizes, and wherein each of the plurality of geometric tolerances is one of a form tolerance, an orientation tolerance, or a position tolerance;

eighth program instructions for determining a location for the each of the plurality of manufactured holes to form a plurality of locations;

ninth program instructions for fitting the framework to the plurality of locations of each of the plurality of manufactured holes to form the fit framework;

tenth program instructions for determining a transformed relationship between the framework and the fit framework to form a best fit framework transformation;

eleventh program instructions for forming a plurality of remaining clearance features from the plurality of remaining clearances, each of the plurality of remaining clearance features including a circle with a diameter substantially equal to a corresponding remaining clearance;

twelfth program instructions for positioning the plurality of remaining clearance features around a single true position;

thirteenth program instructions for superimposing a plurality of transformed true positions onto the single true position to form a single association;

fourteenth program instructions for organizing the plurality of locations for the plurality of manufactured holes relative to the single association to form a plurality of organized manufactured holes in which the single association forms the single true position;

fifteenth program instructions for identifying a common region from between the plurality of clearance features positioned around the single true position;

sixteenth program instructions for determining a maximum inscribed circle within the common region;

seventeenth program instructions for determining a diameter for the maximum inscribed circle;

eighteenth program instructions for determining a center location of the maximum inscribed circle;

nineteenth program instructions for determining a transformation of the center location of the maximum inscribed circle from the single association to form a distance;

twentieth program instructions for determining a minimum remaining float from the maximum inscribed circle; and twenty-first program instructions for determining a pattern transformation by combining the best fit framework transformation and the distance;

wherein the first through the twenty-first program instructions are stored on the non-transitory computer readable storage medium for running by a processor of a computer via a computer readable memory.

\* \* \* \* \*